(12) United States Patent
Whitt et al.

(10) Patent No.: US 8,076,866 B2
(45) Date of Patent: Dec. 13, 2011

(54) ELECTRONIC BALLAST HAVING CURRENT WAVEFORM CONTROL WITHIN THE HALF WAVE

(75) Inventors: Phillip R. Whitt, Salem, MA (US); Alan L. Lenef, Belmont, MA (US)

(73) Assignee: OSRAM Sylania Inc., Danver, MA (US)

( * ) Notice: Subject to any disclaimer, the term of this patent is extended or adjusted under 35 U.S.C. 154(b) by 590 days.

(21) Appl. No.: 12/349,361

(22) Filed: Jan. 6, 2009

(65) Prior Publication Data
US 2010/0171438 A1 Jul. 8, 2010

(51) Int. Cl.
*H05B 37/02* (2006.01)
(52) U.S. Cl. .................. 315/291; 315/307; 315/308
(58) Field of Classification Search .............. 315/209 R, 315/224, 291, 307, 308, 311
See application file for complete search history.

(56) References Cited

U.S. PATENT DOCUMENTS

| | | | |
|---|---|---|---|
| 5,608,294 A | 3/1997 | Derra et al. | |
| 5,859,507 A | 1/1999 | Kern | |
| 6,051,939 A | 4/2000 | Eckert | |
| 6,124,683 A | 9/2000 | Olsen et al. | |
| 6,137,240 A | 10/2000 | Bogdan | |
| 6,522,089 B1 | 2/2003 | Duong et al. | |
| 6,552,498 B1 | 4/2003 | Prasad et al. | |
| 6,700,335 B2 | 3/2004 | Prasad | |
| 6,924,604 B2 | 8/2005 | Chen et al. | |
| 6,939,347 B2 * | 9/2005 | Thompson | 606/34 |
| 7,098,605 B2 | 8/2006 | Oh | |
| 7,170,697 B2 * | 1/2007 | Pate et al. | 359/894 |
| 7,312,586 B2 * | 12/2007 | Montante | 315/291 |
| 7,474,064 B2 * | 1/2009 | Lai et al. | 315/307 |
| 2002/0011803 A1 | 1/2002 | Derra et al. | |
| 2008/0116820 A1 | 5/2008 | Ozasa et al. | |

OTHER PUBLICATIONS

Almeida, P. G. C., et al., "Mode changes on thermionic cathodes: II. Preventing transient spots", 28th ICPIG, Jul. 15-20, 2007, pp. 1815-1818, Bristol, UK.
Dos Reis, F. S., et al., "Electronic Ballast Design System", IECON'03: 29th Annual Conference of the IEEE Industrial Electronics Society, Nov. 2-6, 2003, pp. 800-805, Los Alamitos, CA.
Kuo, Benjamin C., "Automatic Control Systems", fourth edition, Prentice-Hall, Inc., Englewood Cliffs, NJ, 1982, 7 pgs.
Brogan, William L., Ph.D., "Modern Control Theory", Prentice-Hall, Inc./Quantum Publishers, Inc., Englewood Cliffs, NJ, 1982, 23 pgs.

(Continued)

*Primary Examiner* — Jacob Y. Choi
*Assistant Examiner* — Jimmy Vu
(74) *Attorney, Agent, or Firm* — Robert F. Clark; Andrew Marten

(57) ABSTRACT

Aspects of the invention include an electronic ballast and method for controlling current through a lamp to produce various current waveforms through the lamp. In one embodiment, the ballast samples and adjusts the current through the lamp on a micro-second time scale within each half-cycle of the current waveform (i.e., at least twice within a period of a reference waveform). The ballast can accommodate different lamp types, provide arbitrary current waveforms, operate a lamp at multiple power levels, and provide power to the lamp as a function of an operational state of a lamp. For example, in one embodiment, the ballast increases power to the lamp and adjusts the current waveform provided to the lamp as the lamp ages to minimize luminous flux loss caused by darkening of lamp walls and changes in lamp chemistry.

20 Claims, 20 Drawing Sheets

OTHER PUBLICATIONS

Oppenheim, Alan V., et al., "Digital Signal Processing", Prentice-Hall International, London, 1975, 17 pgs.

Lenef, Alan, et al., "Arc Spot Formation on Cold Cathodes in High-Intensity Discharge Lamps", IEEE Transactions on Plasma Science, vol. 30, No. 1, Feb. 2002, 11 pgs., Los Alamitos, CA.

Almeida, P. G. C., et al., "Formation of stationary and transient spots on thermionic cathodes and its prevention", J. Phys. D: Appl. Phys. 41, 2008, pp. 1-9, Bristol, UK.

Moench, Holger, et al., "Light Sources 2004", Proceedings of the Tenth International Symposium on the Science and Technology of Light Sources, Toulouse, France, Jul. 18-22, 2004, Institute of Physics Conference Series No. 182, Institute of Physics Publishing, 4 pgs.

Yin, Yan, et al., "Digital Controller Design for Electronic Ballasts with Phase Control", 35th Annual IEE Power Electronics Specialists Conference, Aachen, Germany, 2004, pp. 1855-1860.

* cited by examiner

US 8,076,866 B2

ELECTRONIC BALLAST HAVING CURRENT WAVEFORM CONTROL WITHIN THE HALF WAVE

FIELD OF THE INVENTION

The present invention generally relates to electronic ballasts for controlling the current through a light source. More particularly, the invention is concerned with short time scale current control in ceramic metal halide electric lamps.

BACKGROUND OF THE INVENTION

Gas discharge lamps provide high efficiency illumination and relatively long life with exceptional color rendering qualities. The electrical characteristics of high intensity discharge (HID) lamps depend on an operational state of the lamp (e.g., ignition, glow to arc, run up, and steady state), chemistry of the components in the lamp, manufacturer variations, lamp to lamp variations, and electrode design. HID lamps generally have negative resistance characteristics on time-scales greater than a few milliseconds such that a ballast is required to fix an operating point to prevent thermal runaway of the lamp. High efficiency electronic ballasts operate on relatively slow time-scales and regulate average lamp power or current to prevent thermal runaway.

Significant electrode-plasma interactions take place on time-scales much shorter than the frequencies at which these electronic ballasts operate. Evaporation and sputtering from an electrode of the lamp correlate with lamp current and cause deposition of electrode material on a wall of an arc-tube of the lamp which reduces lamp life. Therefore, the relatively slow current control response time of electronic ballasts (i.e., controlling average current or power to the lamp) has an adverse effect on lamp life. This effect is exaggerated in electronic ballasts supporting features such as high-current starting (e.g., instant-light or instant-on), dimming, and hot re-strike where adverse electrode-plasma interacts are particularly likely.

Analog ballasts can be configured to operate on faster time scales for increased control over lamp current and reduced adverse electrode-plasma interactions. However, they do not have the flexibility of a digital controller (i.e., high current starting, dimming, hot re-strike and other features). Further, analog systems have limited abilities to adapt to various lamp operating states. For example, run-up and steady-state have very different dynamic impedance characteristics such that one set of analog control parameters may result in instabilities in one of the operating states. Analog control systems (i.e., analog ballasts) are also essentially linear or quasi-linear devices such that incorporating special conditional responses is far more difficult and costly than with a digital approach (i.e., electronic ballasts).

SUMMARY OF THE INVENTION

Aspects of the invention include an electronic ballast and method for controlling current through a lamp to produce various current waveforms through the lamp. In one embodiment, the ballast samples and adjusts the current through the lamp on a micro-second time scale within each half-cycle of the current waveform (i.e., at least twice within a period of a reference waveform). The ballast can accommodate different lamp types, provide arbitrary current waveforms, operate a lamp at multiple power levels, and provide power to the lamp as a function of an operational state of a lamp. For example, in one embodiment, the ballast increases power to the lamp and adjusts the current waveform provided to the lamp as the lamp ages to minimize luminous flux loss caused by darkening of lamp walls and changes in lamp chemistry.

In one embodiment, an electronic ballast for powering a light source includes a controller, a waveform generator, a current sensor, and an amplifier. The waveform generator provides a reference waveform signal indicative of a reference waveform having a period. The current sensor is connected in series with the light source and provides a current signal indicative of a current through the light source. The controller receives the reference waveform signal and the current signal. Optionally, the controller may also receive input from a user such as dim the light source or increase the brightness of the light source. The controller generates an output level signal indicative of an output level as a function of the reference waveform signal and the current signal and provides the output level signal at least twice within each period of the reference waveform. The amplifier receives the output level signal from the controller and applies varying power to the light source as a function of the received output level signal. The amplifier is responsive to the output level signal to vary the power to the light source at least twice within each period of the reference waveform.

In one embodiment, the controller provides a reference waveform selection to the waveform generator and the waveform generator provides a selected one of a plurality of reference waveforms as a function of the reference waveform selection. The controller provides a first reference waveform selection when the light source is operating in a first operating state and a second reference waveform selection when the light source is operating in a second operating state. The first waveform selection is different from the second waveform selection and the first operating state is different from the second operating state. For example, the controller requests a different reference waveform when the light source is operating in a run-up state than when the light source is operating at a steady state.

In general, the invention is not limited to operating HID lamps. Aspects of the invention are also applicable to low pressure lamps (e.g., fluorescent), plasma processing, lasers (e.g., rare-gas, rare-gas ion, and excimer), and related systems.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
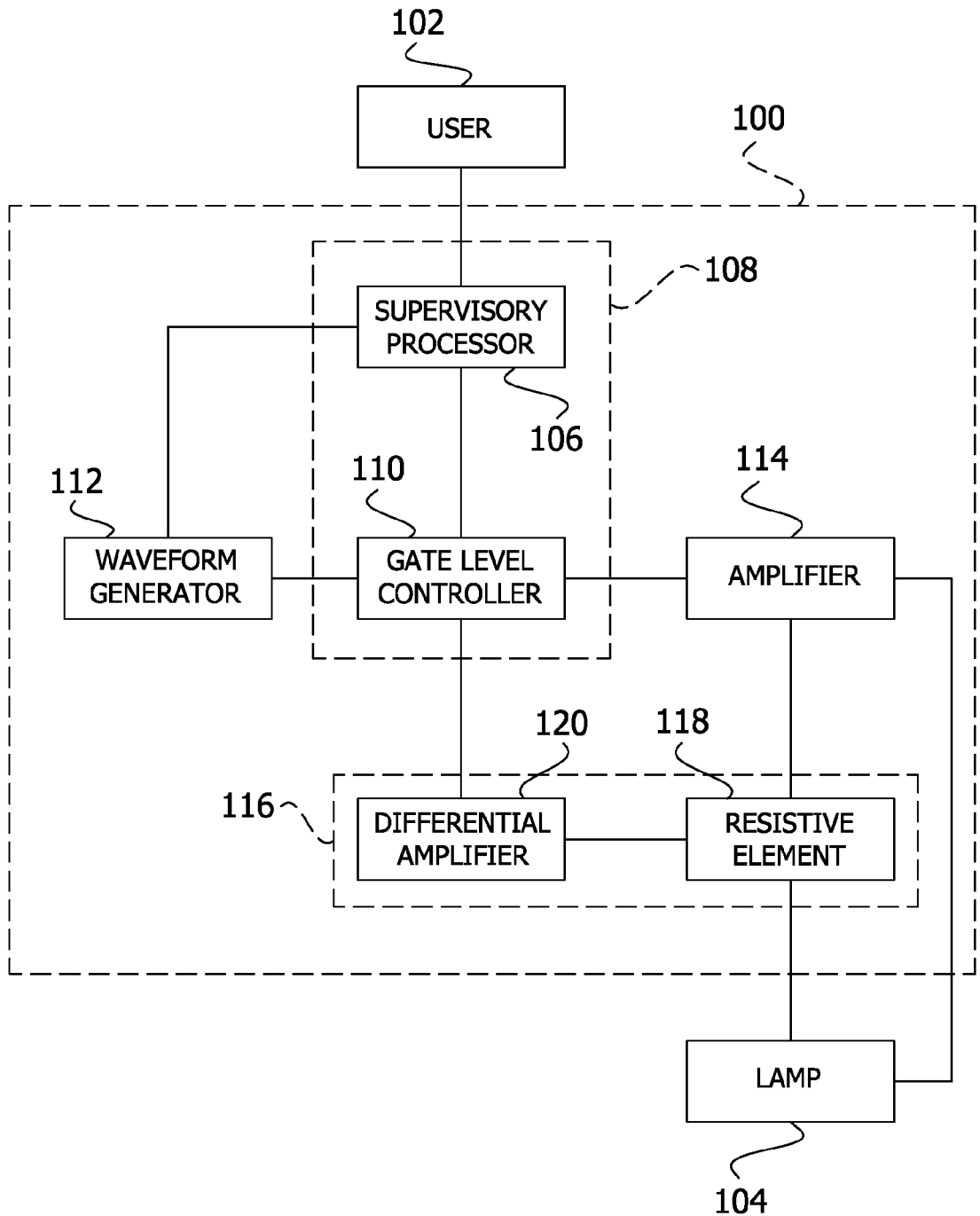
FIG. 1 is a block diagram of an electronic ballast for powering a lamp according to one embodiment of the invention.

Referring to FIG. 1, an electronic ballast 100 receives input from a user 102 and provides power to a light source such as lamp 104. The ballast 100 includes a waveform generator 112, an amplifier 114, a current sensor 116, and a controller 108. In one embodiment, the controller 108 includes a supervisory processor 106 and a gate level controller 110, and the current sensor 116 includes a resistive element 118 in series with the lamp 104 and a differential amplifier 120.

In operation, the user 102 provides inputs to the ballast 100 such as turn on, turn off, and brightness level (e.g., dim, bright, or some level in between). The ballast 100 receives the input from the user 102 at the supervisory processor 106 (e.g., a microcontroller) of the controller 108. The supervisory processor 106 provides operating parameters to the gate level controller 110 (e.g., a field programmable gate array) as a function of the input from the user 102. In one embodiment, the field programmable gate array 110 (FPGA) provides information to the microcontroller 106 about an operating state of the lamp 104 (e.g., ignition, glow to arc, run-up, steady state, end of lamp life, dimmed operation, hot re-strike, fast run-up, cathode spot operation, or vapor arc), and the microcontroller 106 (i.e., supervisory processor) adjusts the operating parameters provided to the FPGA 110 as a function of the operating state of the lamp 104. The controller 108 (i.e., the microcontroller 106) provides a reference waveform selection to a waveform generator 112 of the ballast 100.

In one embodiment, the waveform generator 112 is capable of providing one of a plurality of reference waveforms to the controller. In one embodiment, the waveform generator 112 sequentially reads values corresponding to a reference waveform indicated by the reference waveform selection from a lookup table and provides the read values to the controller 108 in a digital format. In another embodiment, the waveform generator 112 sequentially reads values corresponding to a reference waveform indicated by the reference waveform selection from the lookup table, converts the read values to an analog signal, and provides the analog signal to the controller 108. In yet another embodiment, the waveform generator 112 calculates values from an algorithm and provides the calculated values to the controller 108 digitally, or converts the digital values to an analog signal and provides the analog signal to the controller 108.

The gate level controller 110 receives the reference waveform from the waveform generator and provides an output level to the amplifier 114. In one embodiment, the amplifier 114 is an analog amplifier and the output level is an analog signal that roughly tracks the reference waveform over time (i.e., the output level may not exactly track the reference waveform due to the operational parameters from the supervisory processor 106 and current feedback as discussed in more detail below). In another embodiment, the amplifier 114 includes a D/A converter and the output level is a digital signal. In one embodiment, the amplifier 114 is a switching amplifier including a pulse width modulation controller, and the output level is a duty cycle parameter for the pulse width modulation controller. In another embodiment, a high-speed buck converter is adapted for use as amplifier 114. Other combinations of analog to digital (A/D) and digital to analog (D/A) converters and analog and switching amplifiers are contemplated within the scope of the invention.

Current from the amplifier 114 passes through the lamp 104 and the resistive element 118 of the current sensor 116. In one embodiment, the resistive element 118 is an inductor of an ignition transformer used by the controller 108 to strike the lamp 104. In another embodiment, the resistive element 118 is a resistor. The differential amplifier 120 measures a voltage across the resistive element 118 and provides a signal indicative of the measured voltage, and the current through the lamp 104, to the gate level controller 110 of the controller 108. The gate level controller 110 adjusts the output level as a function of the current through the lamp 104, the operating parameters, and the reference waveform.

Figure 2:
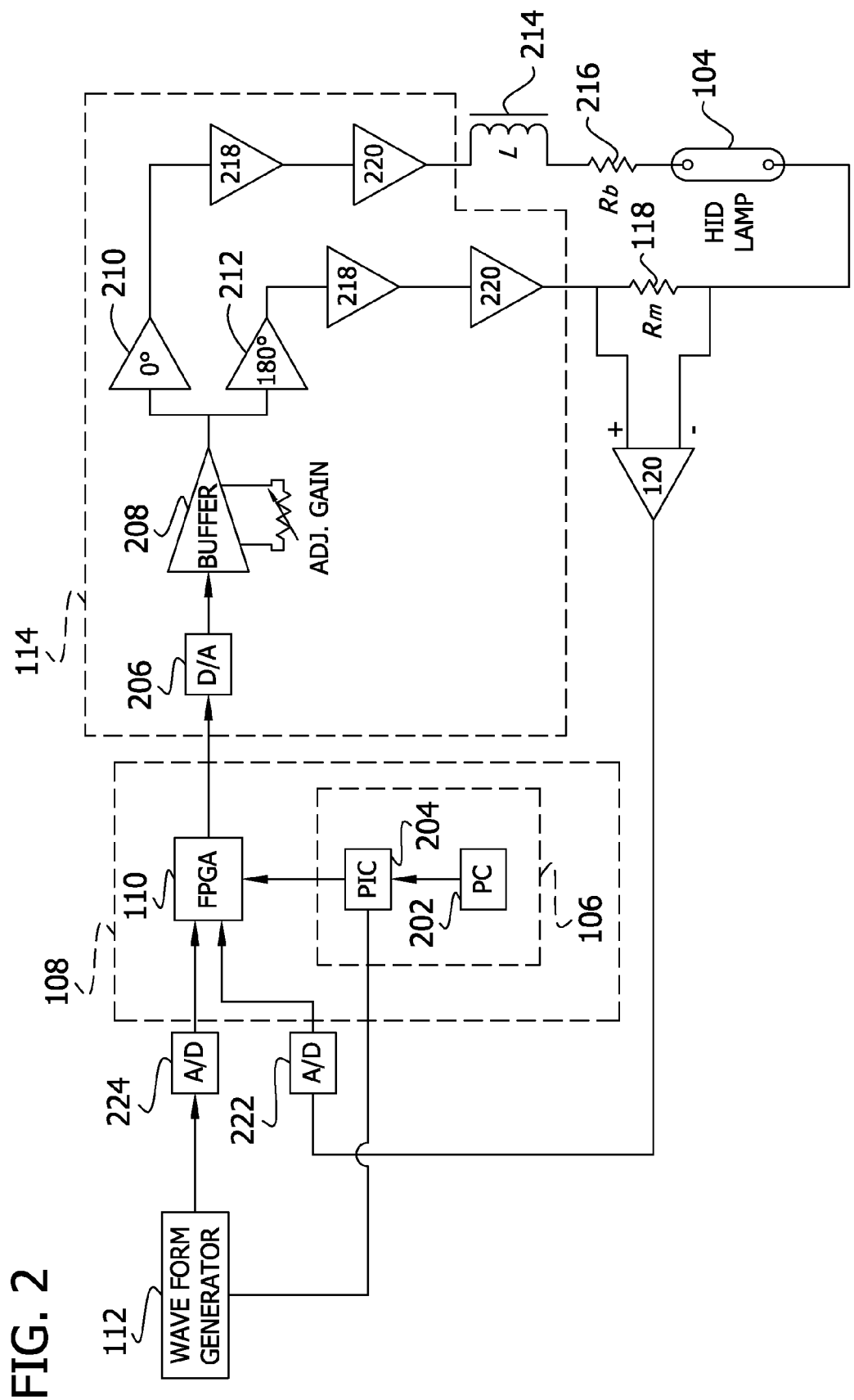
FIG. 2 is a block diagram and partial schematic of an electronic ballast as shown in FIG. 1 according to one embodiment of the invention.

Referring to FIG. 2, in one embodiment, the ballast 100 uses a FPGA as the gate level controller 110 to control current through the lamp 104 on a time scale on the order of 10's of microseconds. Control computations are thus made via hardware that can be programmed using hardware description languages such VHDL or Verilog. The time scale of this embodiment is not limited by the FPGA. Rather, the time scale is a consequence of convenient clock frequencies, clock dividing counters, A/D and D/A converter speed, and the analog devices used, particularly in the amplifier 114 and the current sensor 116. By using faster clock frequencies with different clock dividing counters, employing faster A/D and D/A converters, and higher bandwidth operational amplifiers (i.e., op-amps) in the amplifier 114 and current sensor 116, the time scale of the electronic ballast 100 can be shortened.

In the embodiment of FIG. 2, the supervisory processor 106 includes a personal computer 202 and a microprocessor or PIC 204. The computer 202 provides commands to the PIC 204 and the PIC 204 loads operating parameters into the FPGA 110. The FPGA 110 provides a digital output level to amplifier 114. Amplifier 114 includes a D/A converter 206 for converting the output level from the FPGA 110 into an analog signal. All of the D/A and A/D converters shown in the embodiment of FIG. 2 include a level shifting feature such that any calculations are done in the positive range and the ballast components do not need to support signed math. The D/A converter 206 provides the converted output signal to an adjustable gain buffer 208 which can be adjusted to prevent clipping of the amplifier 114. The adjusted output level is provided to a splitter comprising an in-phase amplifier 210 and an out of phase amplifier 212. Each of the in phase and out of phase amplifiers 210, 212 feed high voltage amplifiers 218 which in turn feed high power buffers 220 to provide the output current from the amplifier 114.

The amplifier output current passes through the secondary of a striking transformer 214, and an optional ballast resistor 216. The optional ballast resistor 216 may be used to improve stability of the ballast output. The amplifier output current also passes through the lamp 104 and the resistive element 118 of the current sensor 116. In the embodiment of FIG. 2, the resistive element 118 comprises a resistor Rm. The differential amplifier 120 (e.g., operational amplifier) monitors the voltage across the resistor 118 and provides the monitored voltage to an A/D converter 222 which samples the monitored voltage and provides digital representation of the voltage, and therefore the current through the lamp 104, to the FPGA 110.

The PIC 204 provides a reference waveform selection to the waveform generator 112. The waveform generator 112 provides an analog reference waveform, and A/D converter 224 samples the reference waveform and provides a digital representation of the reference waveform to the FPGA 110. In the embodiment of FIG. 2, the PIC 204 is a PIC18F2420 manufactured by Microchip, programmed in PICBasic and operating at 16 MHz asynchronous to the FPGA 110. In one embodiment, the FPGA 110 is a Xilinx Spartan II FPGA operating at 40 MHz and the lamp 104 is a 70 W ceramic metal halide lamp model CDM 70/T6/830 from Philips.

Figure 3:
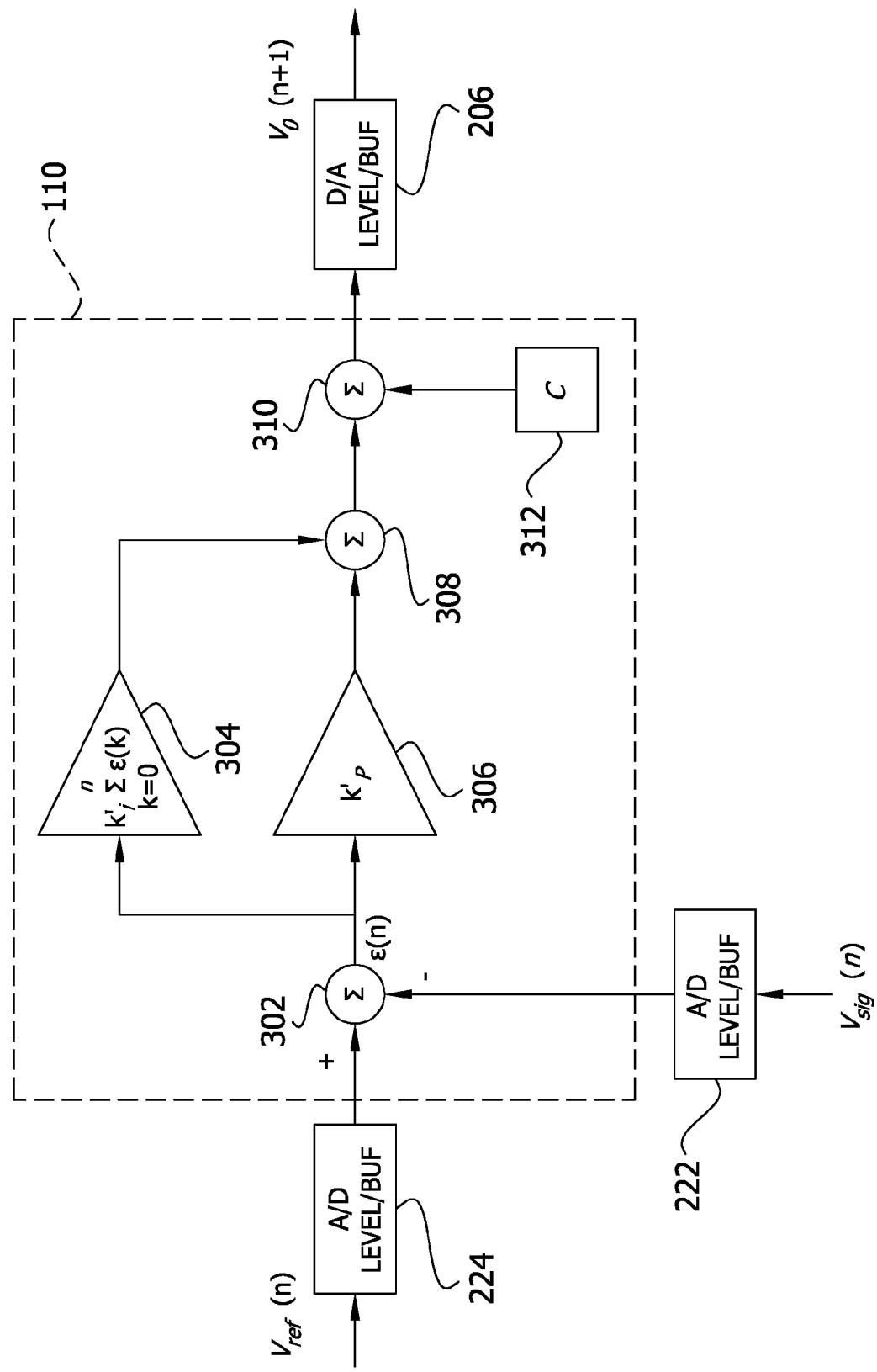
FIG. 3 is a block diagram of firmware for use in the gate level controller of the circuit of FIG. 2 according to one embodiment of the invention.

Referring to FIG. 3, the internal operations of FPGA 110 of FIG. 2 are shown together with the A/D and D/A converters of FIG. 2. The argument n in the operations of the functional blocks of FIG. 3 refers to the nth time-step following the rising edge of a sample clock. The signals $V_{ref}(n)$ and $V_{sig}(n)$ are the bipolar input voltages to the A/D circuits. The output $V_o(n+1)$ is the output of the D/A converter 206 at clock sample n+1. All of the control processing shown in FPGA 110 is performed between each sample clock (i.e., between each sample n).

In the embodiment shown in FIG. 3, FPGA 110 consists of registers, adders, and multipliers, configured to form a proportional-integral (PI) controller. Calculations in the FPGA 110 are performed in 2's complement signed integer arithmetic rather than floating point arithmetic. This simplifies the block functions and increases speed and is accomplished by adding offsets to various points in the system in order to keep the numbers positive within the controller 108 and related parts. It is contemplated that the gate level controller 110 (i.e., FPGA) may be configured as another controller type such as a proportional, integral, derivative controller.

The inputs to the FPGA 110 indicative of the reference waveform signal and the current waveform signal are unsigned 8-bit digital words. Thus, the full scale of ±1.25 V is represented by an 8-bit digital word from 0-255, with 127 representing 0 V. The 8-bit reference and lamp current values go to a subtractor block 302 that generates 9-bit signed (i.e., 8-bit plus a sign bit) integer error signal $\epsilon(n)$. The subtractor block 302 is clocked on the rising edge of the sample clock.

The error signal $\epsilon(n)$ goes to a proportional block 304 and an integrator block 306. While the inputs have a level offset to keep the inputs to the FPGA 110 positive, the error signal $\epsilon(n)$ is the true error signal since the analog offsets are identical and cancel in the difference operation executed by subtractor block 302.

The proportional block 306 multiplies the 8-bit+1 sign bit error signal $\epsilon(n)$ by a 15-bit coefficient $k'_p$. The coefficient is implemented by first scaling the error signal $\epsilon(n)$ by a 7-bit, externally switchable multiplier, KX. This 15 plus 1 bit result is then multiplied by an 8-bit coefficient (i.e., operating parameter) KP_PIC loaded by the PIC 204. This gives an overall range of coefficient $k'_p$=KP_PIC×KX. The range of $k'_p$ is therefore 0-255 to 0-255×127. The resulting proportional signal is a 23+1 bit signed result. In one embodiment, the multiplications are implemented by standard FPGA IEEE arithmetic libraries and a Booth multiplier. The switch settings KX=$2^6$; therefore $k'_p$=$2^6$×KP_PIC.

The integration block 304 accumulates the error signal $\epsilon(n)$. The integration block 304 contains a delay register, two reset registers and a 2-port adder. The adder is a signed device which allows both positive and negative 2's complement values to pass to the integrator output. Another multiplier block follows the integrator, multiplying the integrator output by an 8-bit coefficient $k'_I$=KI_PIC. The integrator is designed not to accumulate indefinitely; it saturates to a maximum signed value of ±($2^{15}$−1). For example, if the integrator saturates at the most positive value, this causes the lamp current to be highly positive and will exceed the reference signal. This creates a negative error which will be subtracted from the current integrator value, therefore pulling the integrator out of the saturation condition.

The outputs of the Booth multipliers from the proportional and integral blocks are summed by a 24-bit adder 308 from the standard International Electrical and Electronics Engineering (IEEE) library (IEEE Std 1076.1-1999). A second adder 310 adds in an offset 312 of $2^{23}$ to the proportional and integral sums to keep the output level signal from the FPGA 110 positive. This is done because the D/A converter 206 is unipolar (i.e., cannot handle signed numbers). The D/A converter 206 contains an analog level shifter to convert the output level signal back to its correct bipolar value. In one embodiment, the D/A converter 206 is 14-bit. The 14 bits connect to the uppermost 14 bits of the total 24-bit FPGA output. In the embodiment of FIG. 2, higher resolution at the FPGA output is not helpful because the error signal $\epsilon(n)$ is only 8+1 bits. The D/A converter 206 in one embodiment is a standard R-2R resistance ladder network, driven by CMOS buffers.

The mathematical relation between input voltages to the A/D circuits 222 and 224 and the analog output voltage from the D/A circuit 206 can be expressed as shown in Equation 1 where $T_s$ is the sample clock period.

$$V_o(n+1) = k_p \varepsilon(n) + k_i T_s \sum_{m=0}^{n} \varepsilon(m), \quad \text{(Equation 1)}$$

The error signal $\epsilon(n)$ is given in Equation 2.

$$\epsilon(n) = V_{ref}(n) - V_{sig}(n). \quad \text{(Equation 2)}$$

The first term $k_p$ in Equation 1 amplifies the error signal $\epsilon(n)$ to provide a direct correction. However, use of only a proportional control implies that there is a steady-state error between the actual and desired signals. This is because the amplified error signal is exactly what drives the load (lamp).

The integrated error signal eliminates this offset problem by providing a driving signal that builds to the correct driving value by accumulating error signals. The accumulation stops once the error reaches zero.

The control coefficients $k_p$ (V/V) and $k_i$ (V/V-s) would be the actual proportional and integral gains of an equivalent analog PI control system. They are related to the digital values set by the PIC 204 as shown in Equations 3 and 4.

$$k_p = KX \cdot KP\_PIC \cdot K_a \cdot G_a, \quad \text{(Equation 3)}$$

$$k_i = \frac{KI\_PIC \cdot K_a \cdot G_a}{T_s}. \quad \text{(Equation 4)}$$

The factor $K_a$ represents the combined A/D converter and D/A converter scaling for the 0-2.5 V full-scale A/D converter range represented by 8-bits and 0-5.0 V full scale D/A converter output. The full-scale (i.e., 5V) D/A converter output occurs when all 24 bits at the FPGA 110 output are high. The factor $K_a$ in the embodiment of FIGS. 2 and 3 is thus $2^{-15}$V/V as shown in Equation 5.

$$K_a = \frac{2^8}{2.5 \text{ V}} \cdot \frac{5.0 \text{ V}}{2^{24}} = 2^{-15} \text{V/V} \quad \text{(Equation 5)}$$

Referring back to FIG. 2, the factor $G_a$ in Equations (3) and (4) is the corresponding analog gain provided by D/A converter 206 and adjustable gain buffer 208. In one embodiment, the D/A stage analog gain setting is $G_a$=10V/V, although in general it may be variable. For example, taking KX=$2^6$, KP_PIC=255, and KI_PIC=80 would give control block gains: $k_p$=5 and $k_i$=3.05×10$^4$ s$^{-1}$. For the embodiment shown in FIG. 2, the analog voltage gain after the FPGA 110 (i.e., the gain of amplifier 114) is adjustable from 76V/V to 340V/V.

Figure 4:
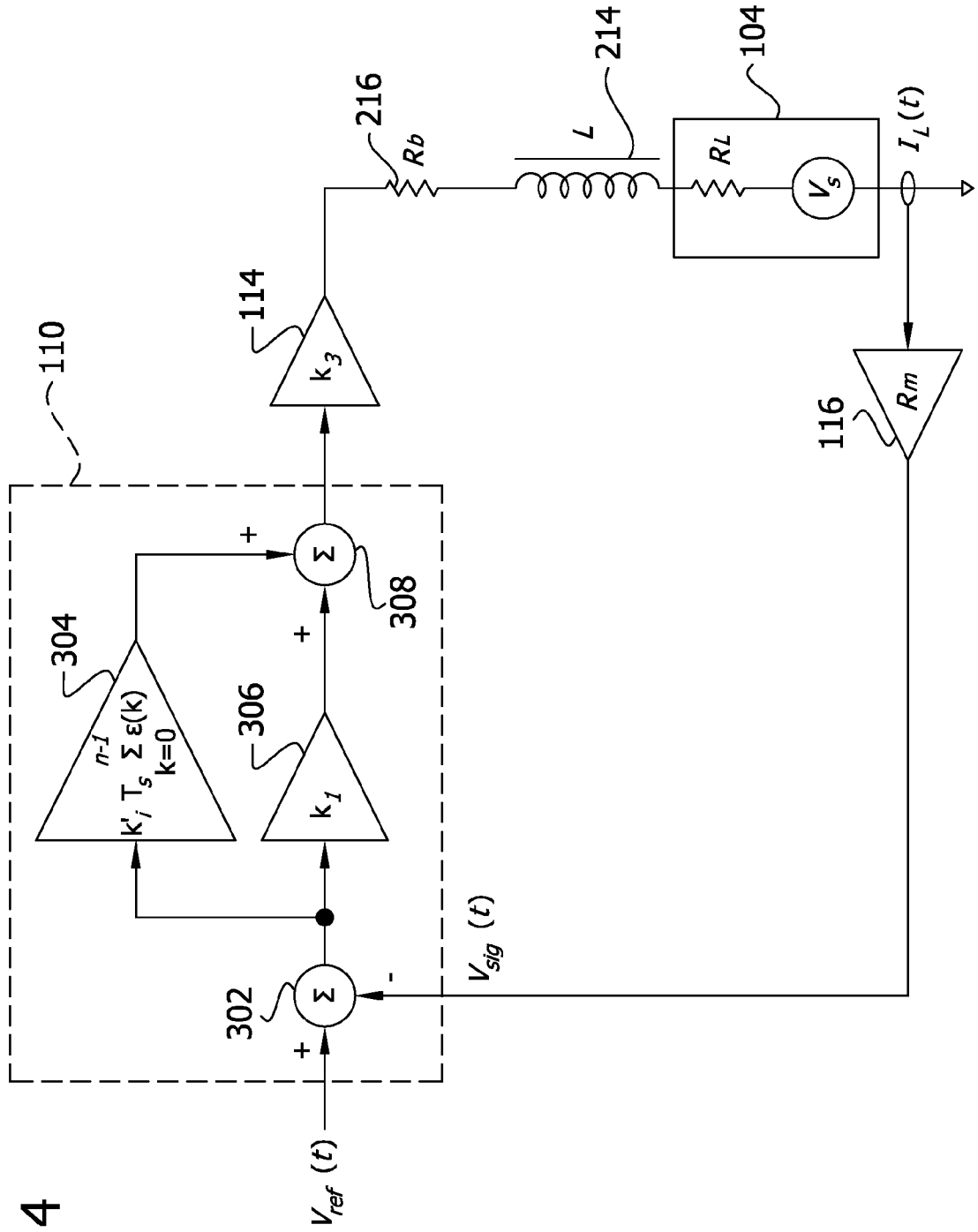
FIG. 4 is a simplified block diagram of the gate level controller firmware of FIG. 3 according to one embodiment of the invention.

Referring to FIG. 4, a simplified block diagram of the embodiment of FIGS. 2 and 3 shows equivalent circuits for the amplifier 114 and lamp 104. $R_b$ is the net resistance in series with the lamp 104 including a 25Ω current sense resistance (i.e., resistive element 118) in the embodiment of FIG. 2. $R_m$ is an equivalent current sensor scale factor. Typical values used in the current embodiment are: $R_b$=50Ω, and $R_m$=1.0Ω which gives a sensitivity of 1 A/V. In another embodiment, $R_b$ is 0Ω which increases the efficiency of the ballast 100.

The lamp 104 is modeled by a resistance $R_L$ and a voltage source $V_s$. The resistance is roughly the resistance of gas discharge between electrodes of the lamp 104 and depends on the power applied to the lamp 104 and the temperature distribution of the gas discharge within the lamp 104. The lamp resistance can change over time scales greater than a plasma thermal decay time $\tau_p$ which is generally 10 to 1000 milliseconds. The voltage source $V_s$ represents space charge potentials appearing in cathode and anode sheath regions of the lamp 104. These characteristic equivalent lamp circuit elements can vary widely, depending on the operating state of the lamp 104 (e.g., whether the lamp 104 is in run-up or in steady-state operation).

Reasonable values for the lamp equivalent circuit elements for steady-state operation can be determined based on the lamp operating power $P_L$ and nominal root mean squared (RMS) operating voltage $V_L$ as shown in Equation 6.

$$R_L \approx (V_L - V_s)^2 / P_L \quad \text{(Equation 6)}$$

For metal halide lamps in the 10-1000 watt power range, typical sheath voltages are on the order of 10-20 V and have a relatively weak dependence on lamp current. Thus, a typical 70 W lamp operating at 90 V would have a nominal resistance of roughly $R_L$=90Ω.

During lamp start up, gas discharge conditions are different than steady-state. The positive column of the gas discharge generally appears as a rare gas discharge at sub-bar pressures with much lower potentials (i.e., voltages) than a mercury discharge of the same length. Voltage of the lamp 104 is often dominated by the cathode sheath. Just after ignition the cathode region makes transitions between high-voltage abnormal glows and low-voltage, high-current vapor arcs. These transitions can occur on sub-microsecond time scales and are often responsible for momentary cessation of the discharge and light output if the ballast cannot follow the rapid load changes. The use of the series inductor L facilitates these transitions.

As the lamp electrodes heat to thermionic temperatures, the voltage waveforms may initially display re-ignition peaks on the order of 50 V or less above the average lamp voltage during a half-cycle of a period of the reference waveform. These features result, at least in part, from higher thermionic cathode falls that arise because the electrodes are not fully heated. These re-ignition features decrease as electrodes approach steady-state temperatures. This start up scenario generally occurs in the first couple of seconds of lamp operation. For purposes of modeling the lamp 104 during start up, we can just assume it is a resistor whose value depends on the discharge mode (glow, vapor, or thermionic or steady state) and to a lesser extent the instantaneous current through the lamp 104.

Figure 5:
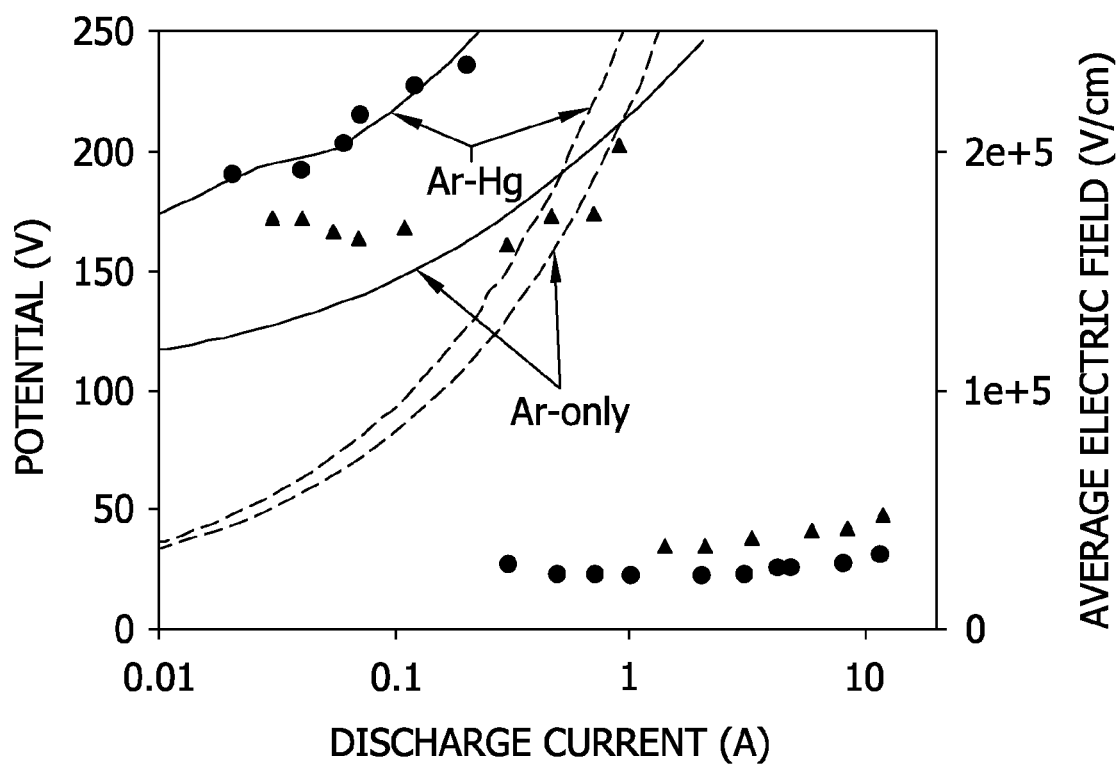
FIG. 5 is a graph of exemplary current and voltage relationships in a metal halide arc tube during starting conditions (i.e., run-up).
Figure 6A:
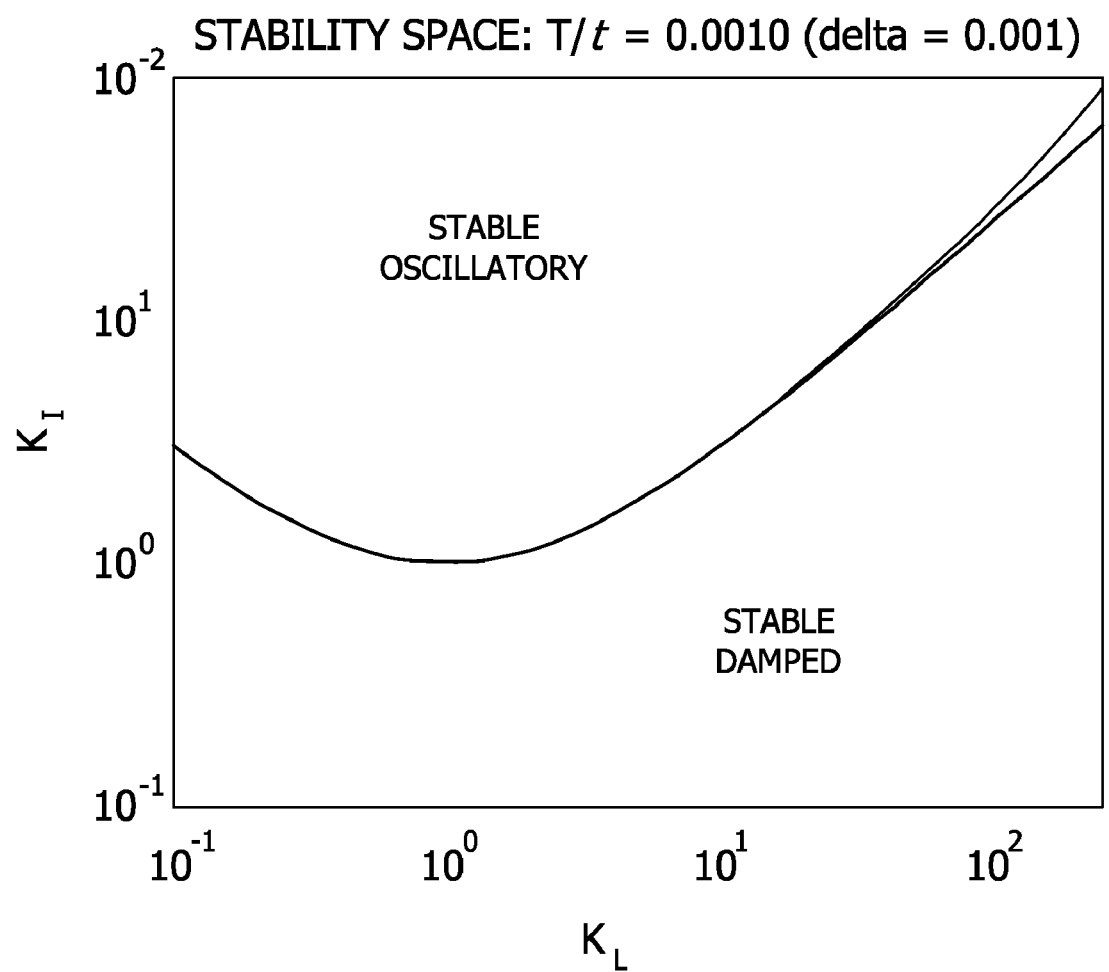
FIGS. 6A-D are a group of graphs showing stability regions for ballasts having various design parameters according to one embodiment of the invention.
Figure 6B:
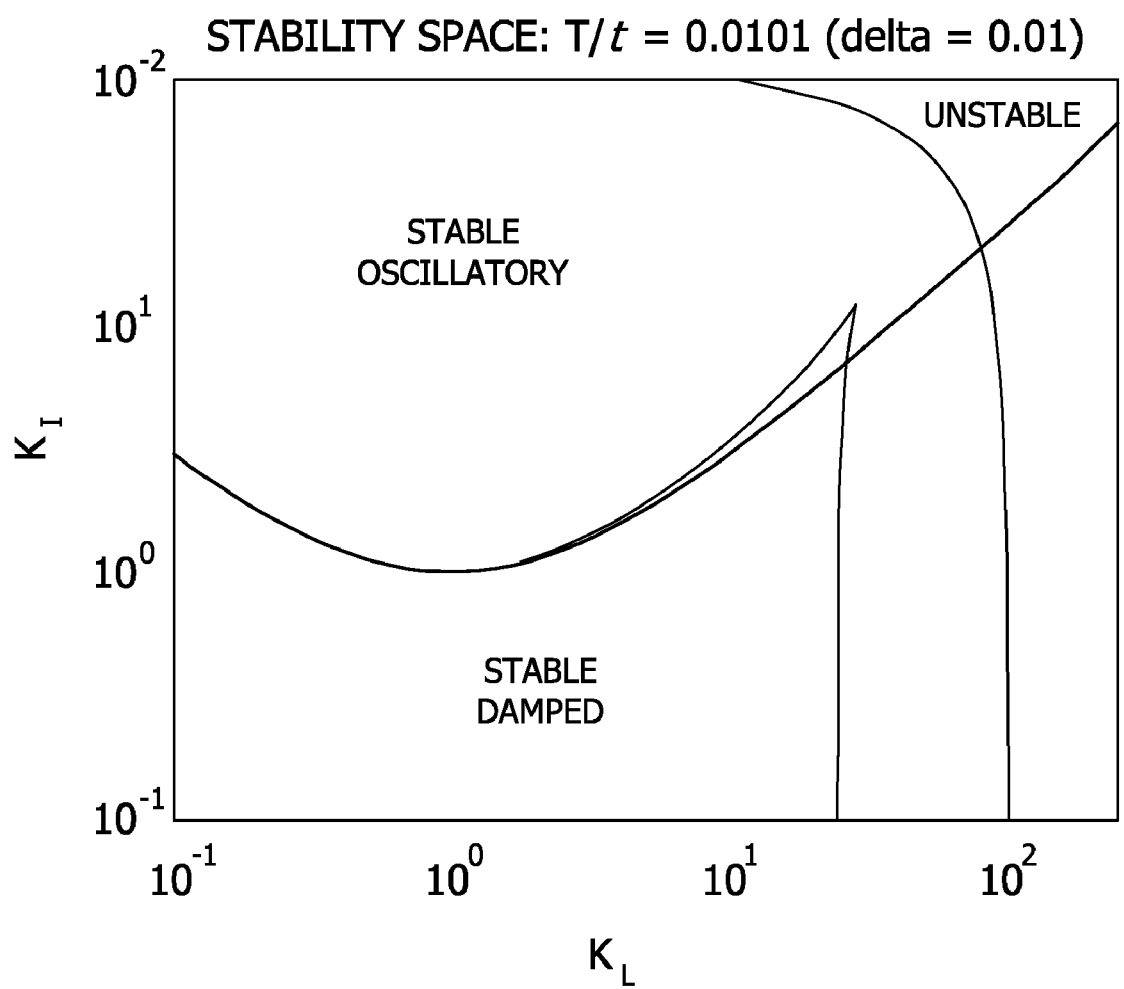
Figure 6C:
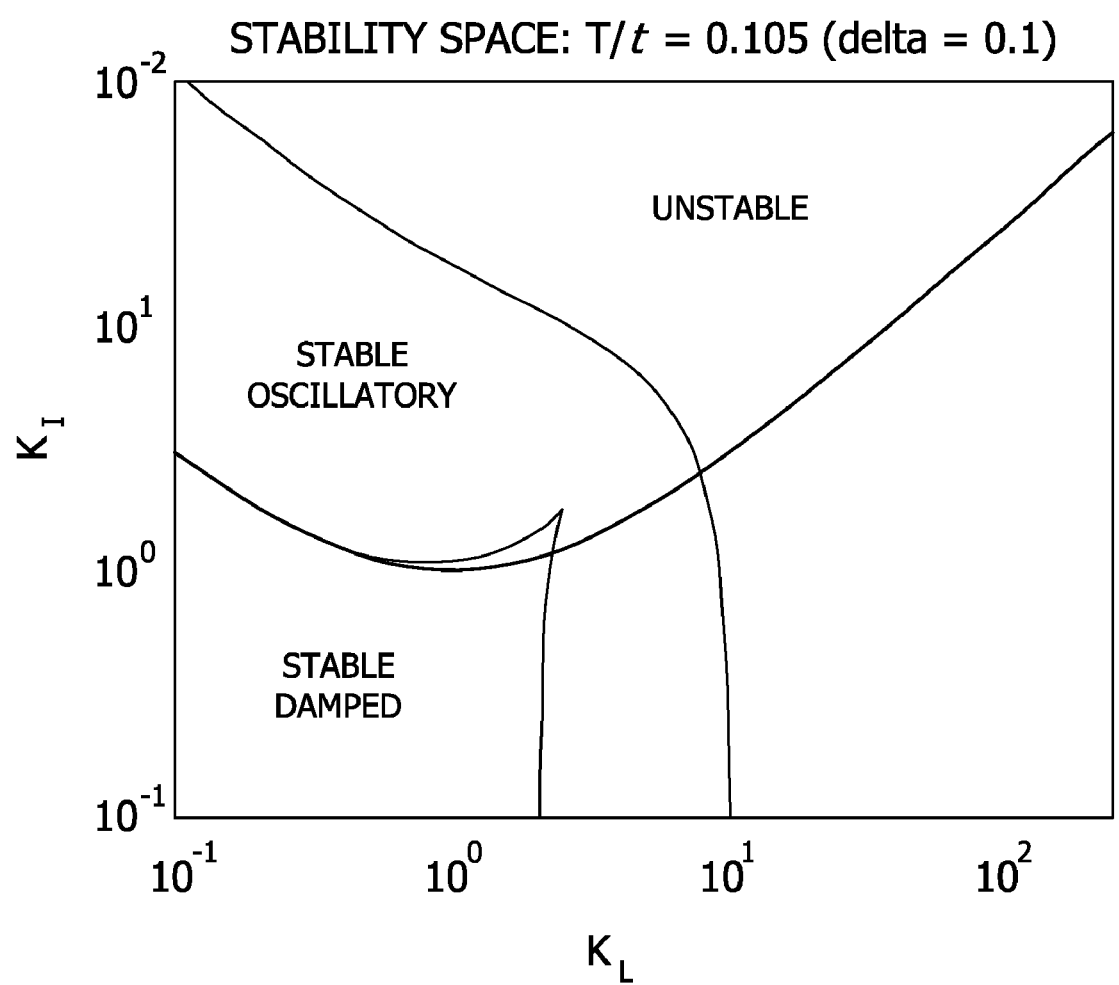
Figure 6D:
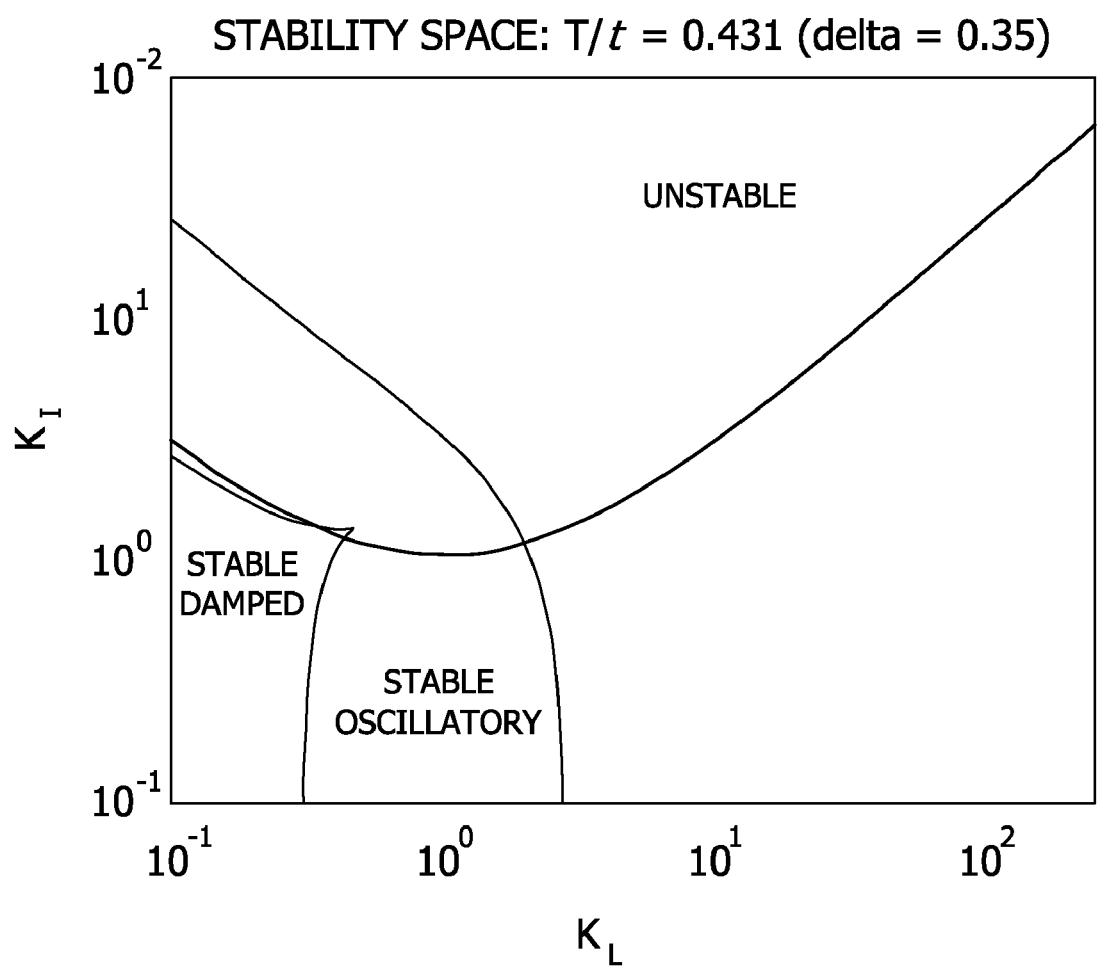

Referring to FIG. 5, an example of typical I-V curves for the abnormal glow and vapor arc operating states are shown. These curves were obtained using a pulsed high-voltage power source for 100 W metal halide arc tubes having an Argon fill and an Argon-Mercury fill at 100 torr. Above a threshold current which depends on composition of the fill (i.e., chemistry of the elements in the lamp 104), the discharge transfers from an abnormal glow state to a low voltage vapor arc. The slopes of the curves (note log scales) indicate approximate ranges of discharge resistances, depending on current. Lamp resistance varies from 0-50 Ohms in an abnormal glow state, and from 1-5 Ohms in a vapor arc state (i.e., steady state operation). As the lamp fill (i.e., chemical elements in the lamp 104) begins to vaporize during run-up, the discharge becomes more resistive and Equation 6 is then useful for estimating the lamp resistance.

Control loop stability and transient response of the ballast 100 are governed by Equations 6-12. A resistance $R_{eq}$ is the combined ballast and effective lamp resistance as shown in Equation 7.

$$R_{eq} = R_b + R_L \quad \text{(Equation 7)}$$

In embodiments where current sensing is performed using a small series resistance, it should also be included in $R_{eq}$. In the embodiment of FIGS. 2-4, the control loop response time is controlled by a single pole filter formed by the inductor L and the equivalent series resistance $R_{eq}$ from Equation 7. This R-L time constant is represented by $\tau$ as shown in Equation 8.

$$\tau = L / R_{eq}. \quad \text{(Equation 8)}$$

A loop gain $k_L$ represents the net voltage gain of the error signal $\epsilon(t)$ as the entire circuit is analyzed with no integration (i.e., $k_i$=0) as shown in Equation 9.

$$k_L \equiv \frac{R_m k_i k_3}{R_{eq}}. \quad \text{(Equation 9)}$$

A normalized integration constant represents the relative contribution of the integral function to the overall feedback signal during one low-pass filter time-constant as shown in Equation 10.

$$\kappa_I \equiv \frac{k_i \tau}{k_p}. \quad \text{(Equation 10)}$$

A relative sampling rate $\delta$ and rescaled integration time $\kappa'_I$ characterize the discrete time sampling of the digital control loop as shown in Equations 11 and 12.

$$\delta \equiv 1 - \exp(-T/\tau) \quad \text{(Equation 11)}$$

$$\kappa'_I = \ln(1+\delta)\kappa_I. \quad \text{(Equation 12)}$$

Using z-transform theory, a general condition for stability and the transient response of the system is derived. The roots of the discrete-time characteristic equation for the system of FIG. 4 gives the stability and transient response of the ballast 100 as shown in Equation 13.

$$z(z-1)(z-1+\delta)+k_L\delta[(1+\kappa'_I)z-1]=0 \quad \text{(Equation 13)}$$

When all of the roots of the variable z of the characteristic equation (Equation 13) lie within the unit circle on the complex plane, the system is stable. Overdamping occurs when only real roots exist. Taking the limit of $T/\tau$, Equation 13 reduces to the continuous-time case. The plots of FIGS. 6A-D delineate regions of stability and type of response (damped or oscillatory) for the ballast 100 of FIGS. 2-4. These results allow one to choose appropriate control parameters for a given lamp type and expected performance conditions. The borders between the regions in the plots of FIGS. 6A-D correspond to the continuous-time case which would be appropriate for an analog control system with a dominant pole.

Circuits other than the lamp-inductor circuit (i.e., the inductor L, the lamp 104, and resistances, capacitances, and inductances in series and parallel with the lamp 104) used in Equation 13 may provide the dominant pole (i.e., the slowest time constant of the system) of the system (i.e., the open loop system). Making the igniter inductance large (i.e., inductor L) reduces the influence of lamp dynamics on the control loop stability because it increases time-constant $\tau$ of the analog system (i.e., increases the analog response time of the system; see Equation 8). Reducing the inductance of inductor L decreases the response time of the lamp-inductor circuit, and reduces the stability of the system for a controller 108 with a given sample rate. When reducing the inductance of inductor L, other circuits providing the dominant pole of the system must still satisfy the stability condition described with respect to Equation 13. In the case where the dominant pole of the system is not the pole of the lamp-inductor circuit and the pole of the lamp-inductor circuit is of similar magnitude, Equation 13 no longer holds since the system is higher order. However, Equation 13 may still be used to estimate worst-case stability where time-constants from either the lamp 104 or circuit element alone are used in Equation 13. Further, additional poles may increase the range of lamp conditions and transient response range that provide stable control loop operation.

Figure 7:
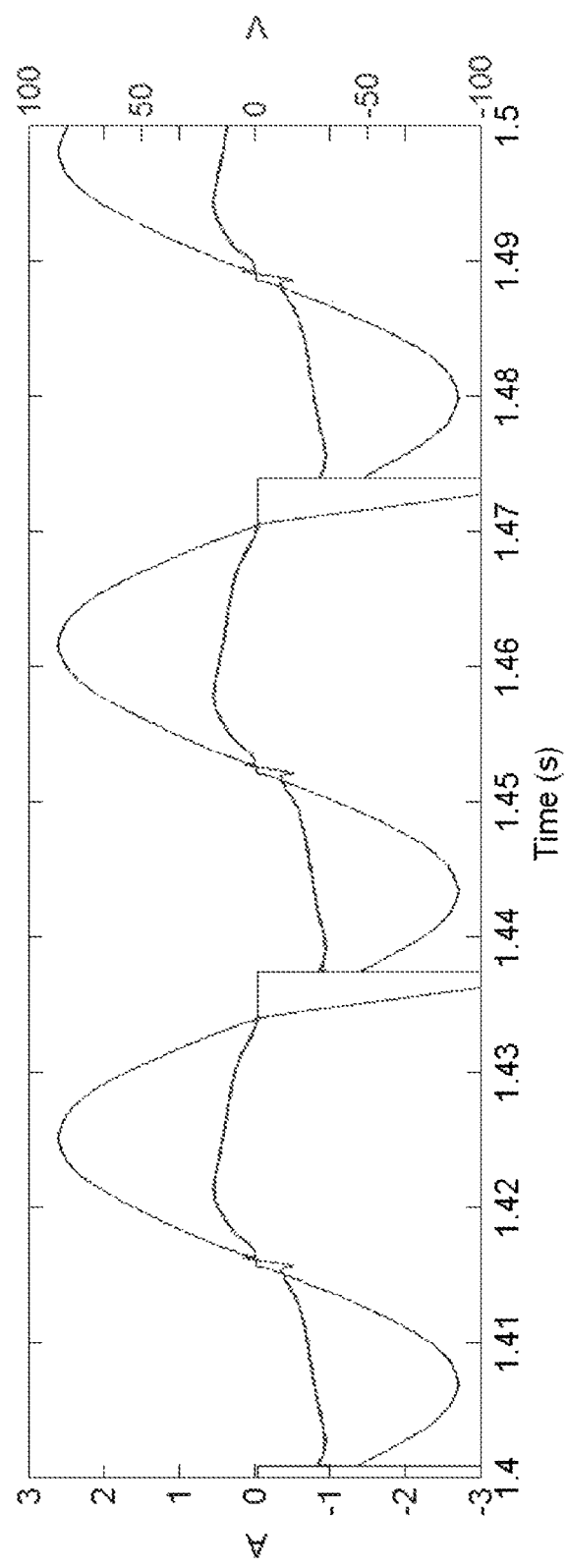
FIG. 7 is graph of a 30 Hz sinusoidal reference waveform and a lamp current over time as applied by a ballast without closed loop control to a lamp during run-up.
Figure 8:
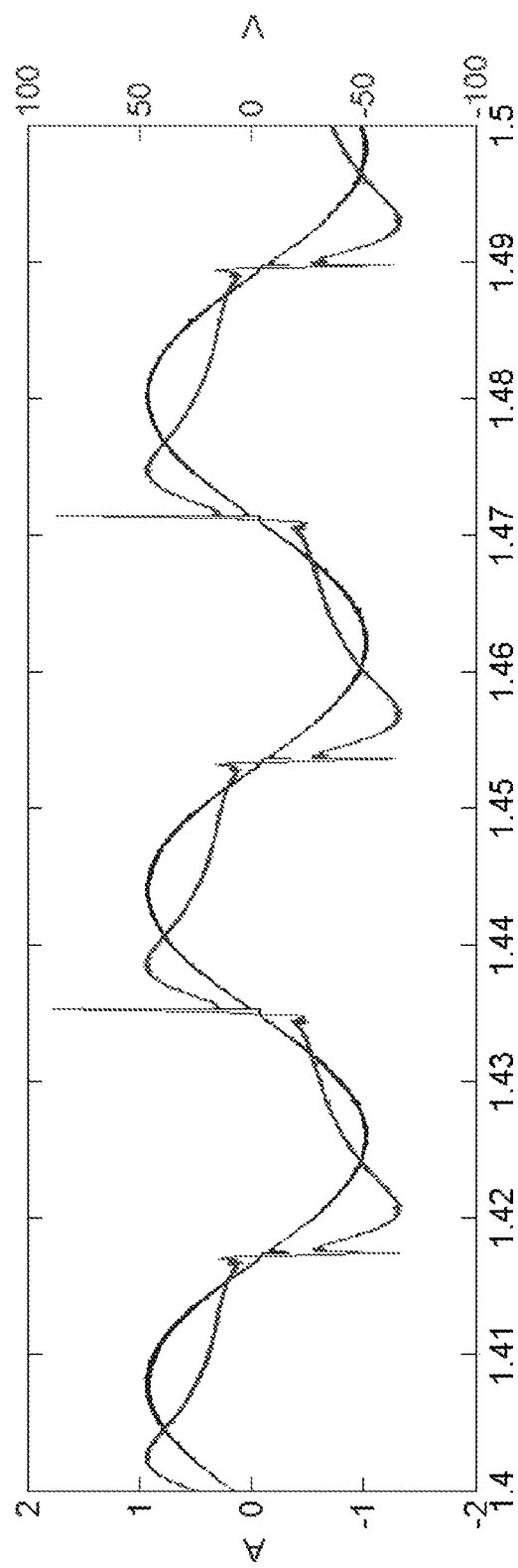
FIG. 8 is graph of a 30 Hz sinusoidal reference waveform and a lamp current over time as applied by a ballast with closed loop control to a lamp during run-up according to one embodiment of the invention.

Referring to FIGS. 7 and 8, a sinusoidal reference waveform is applied to the lamp 104 using the embodiment of the invention shown in FIGS. 2-4 during run-up of the lamp 104. In FIG. 7, the controller 108 is prevented from adjusting the output level signal as a function of lamp current such that the ballast 100 behaves similarly to prior art ballasts (i.e., acts as a large time scale current source). In FIG. 8, closed loop control of the current through the lamp 104 is enabled in the ballast 100 (i.e., the ballast adjusts the output level signal as a function of the current through the lamp within the half wave of the period of the reference waveform), and the re-strike current spikes are reduced which reduced damage to the lamp electrodes.

Figure 9:
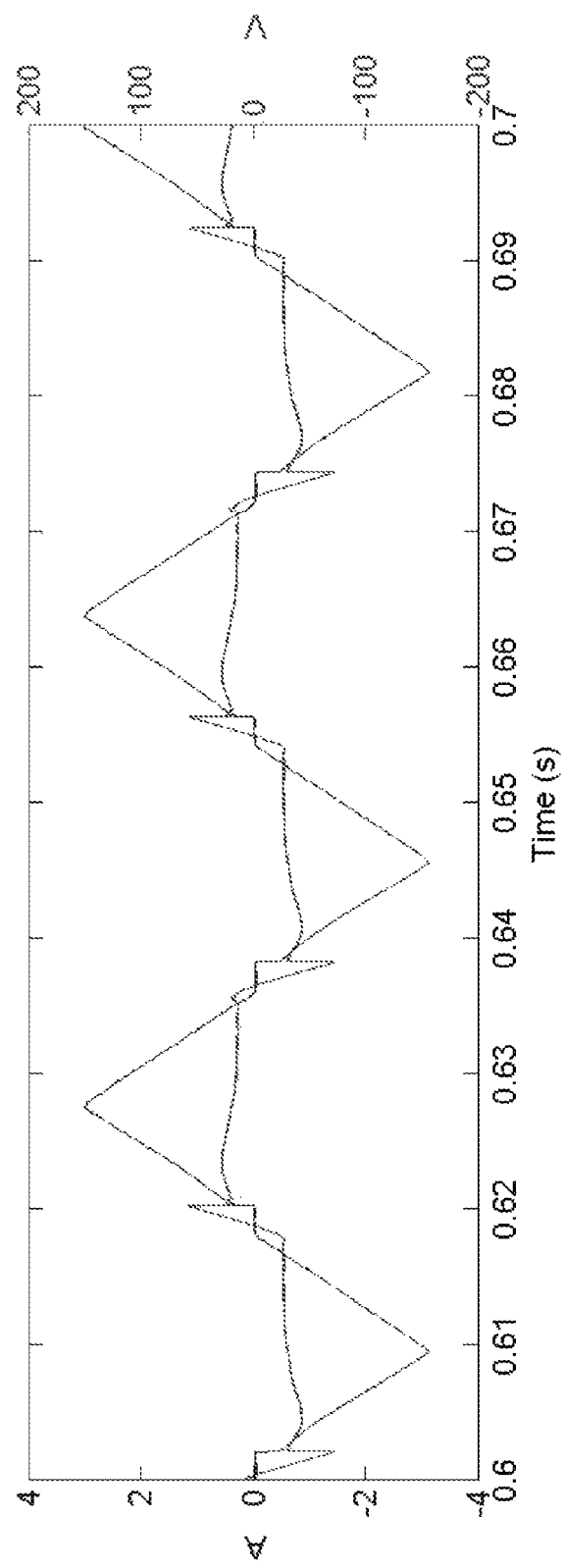
FIG. 9 is graph of a 30 Hz triangular reference waveform and a lamp current over time as applied by a ballast without closed loop control to a lamp during run-up.
Figure 10:
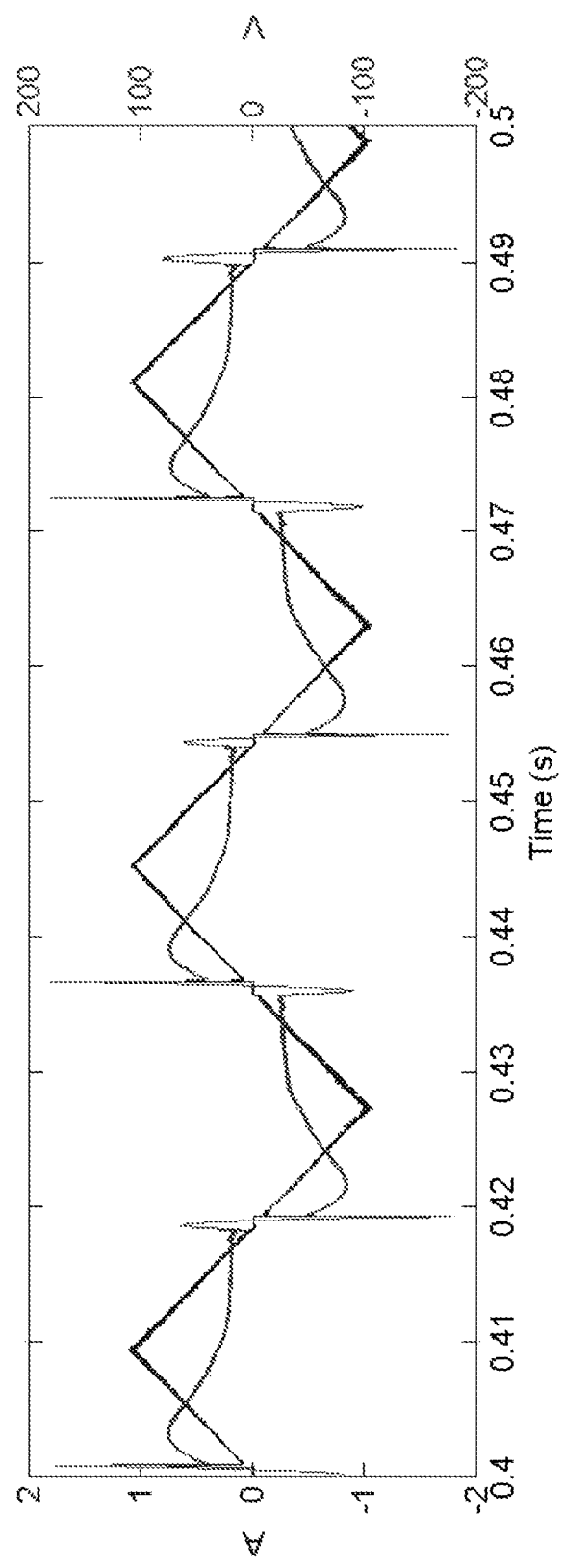
FIG. 10 is graph of a 30 Hz triangular reference waveform and a lamp current over time as applied by a ballast with closed loop control to a lamp during run-up according to one embodiment of the invention.
Figure 11:
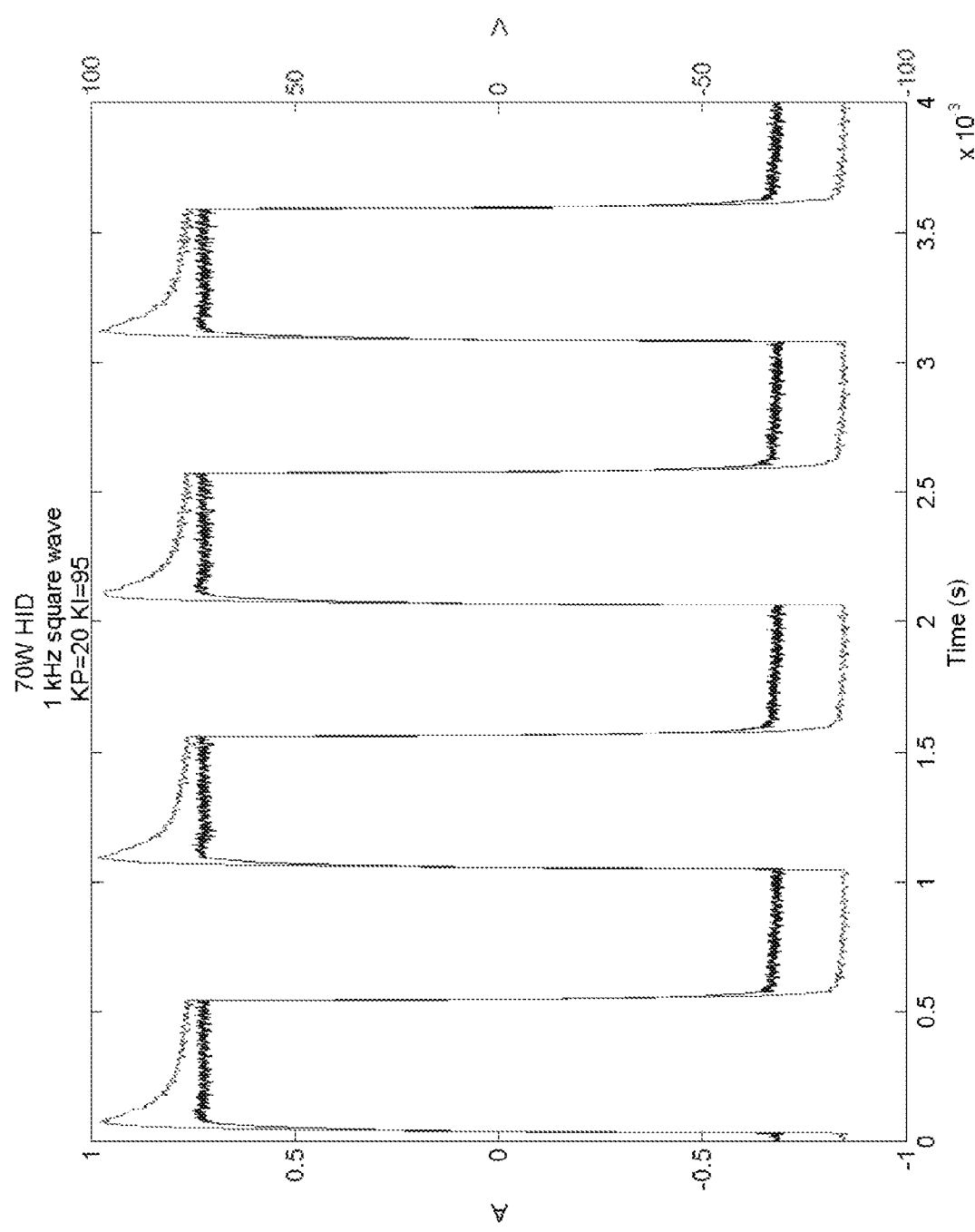
FIG. 11 is graph of a 1 kHz square wave reference waveform and a lamp current over time as applied by a ballast with closed loop control to a lamp during steady state operation according to one embodiment of the invention.
Figure 12:
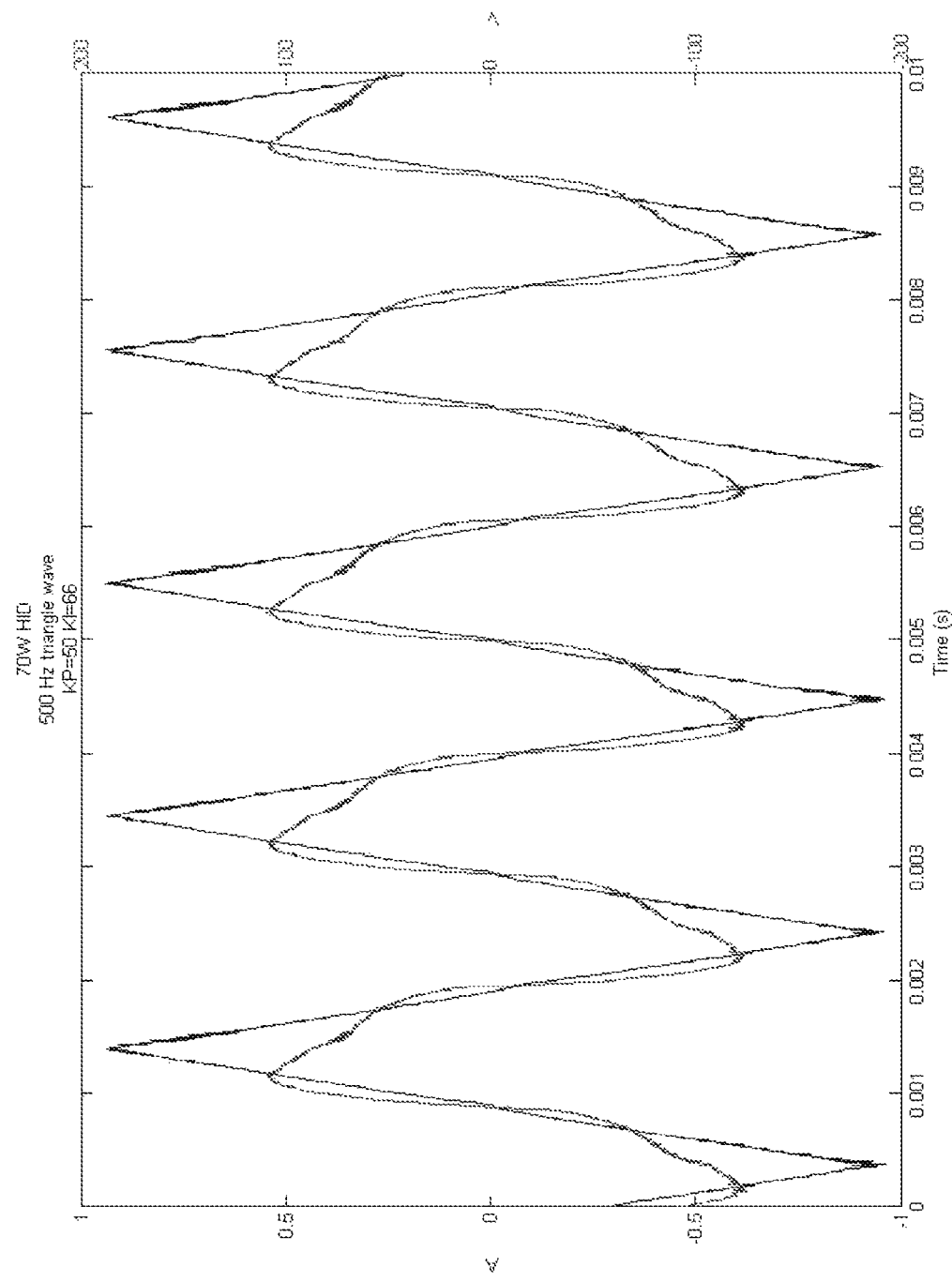
FIG. 12 is graph of a 500 Hz triangular reference waveform and a lamp current over time as applied by a ballast with closed loop control to a lamp during steady state operation according to one embodiment of the invention.
Figure 13:
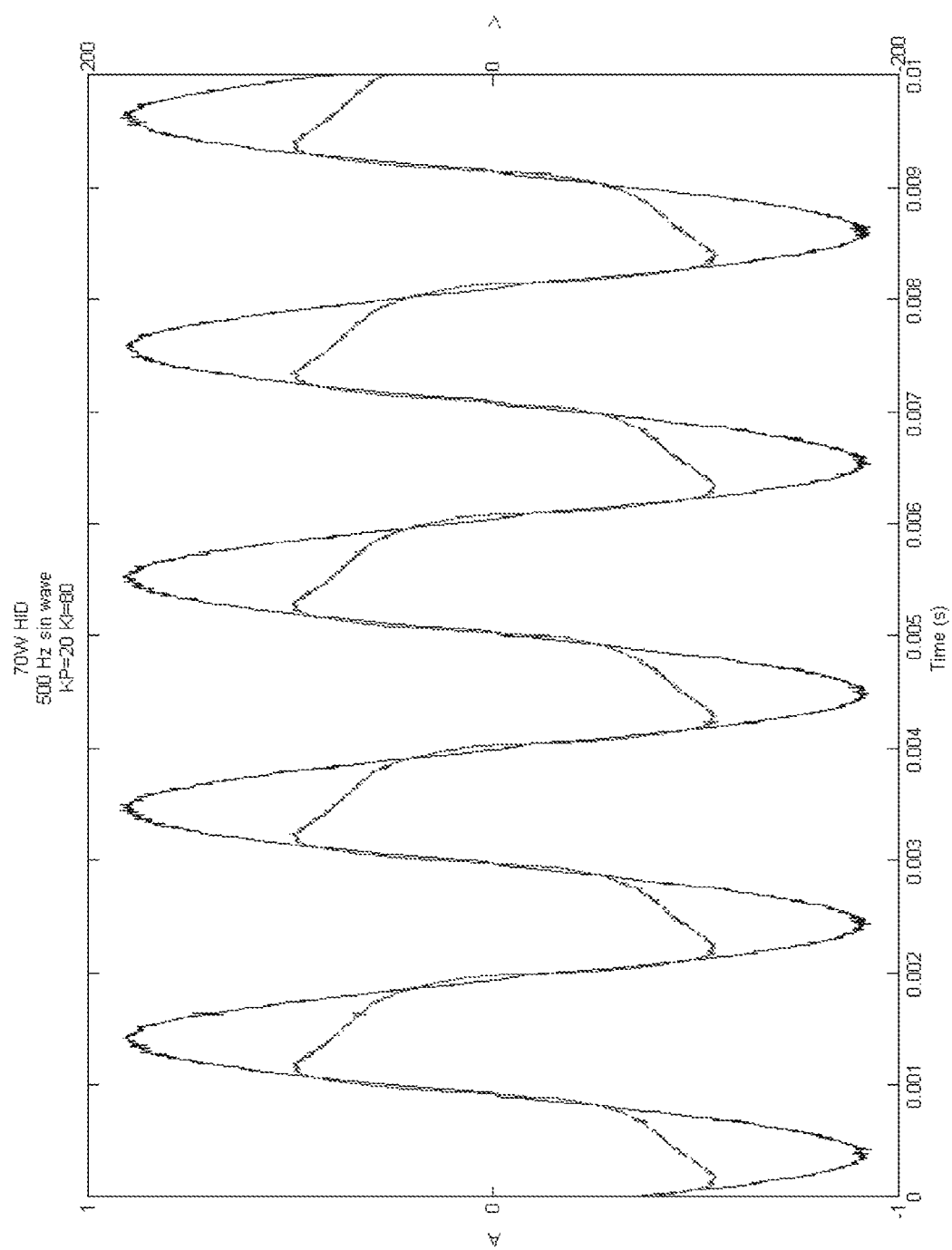
FIG. 13 is graph of a 500 Hz sinusoidal reference waveform and a lamp current over time as applied by a ballast with closed loop control to a lamp during steady state operation according to one embodiment of the invention.
Figure 14:
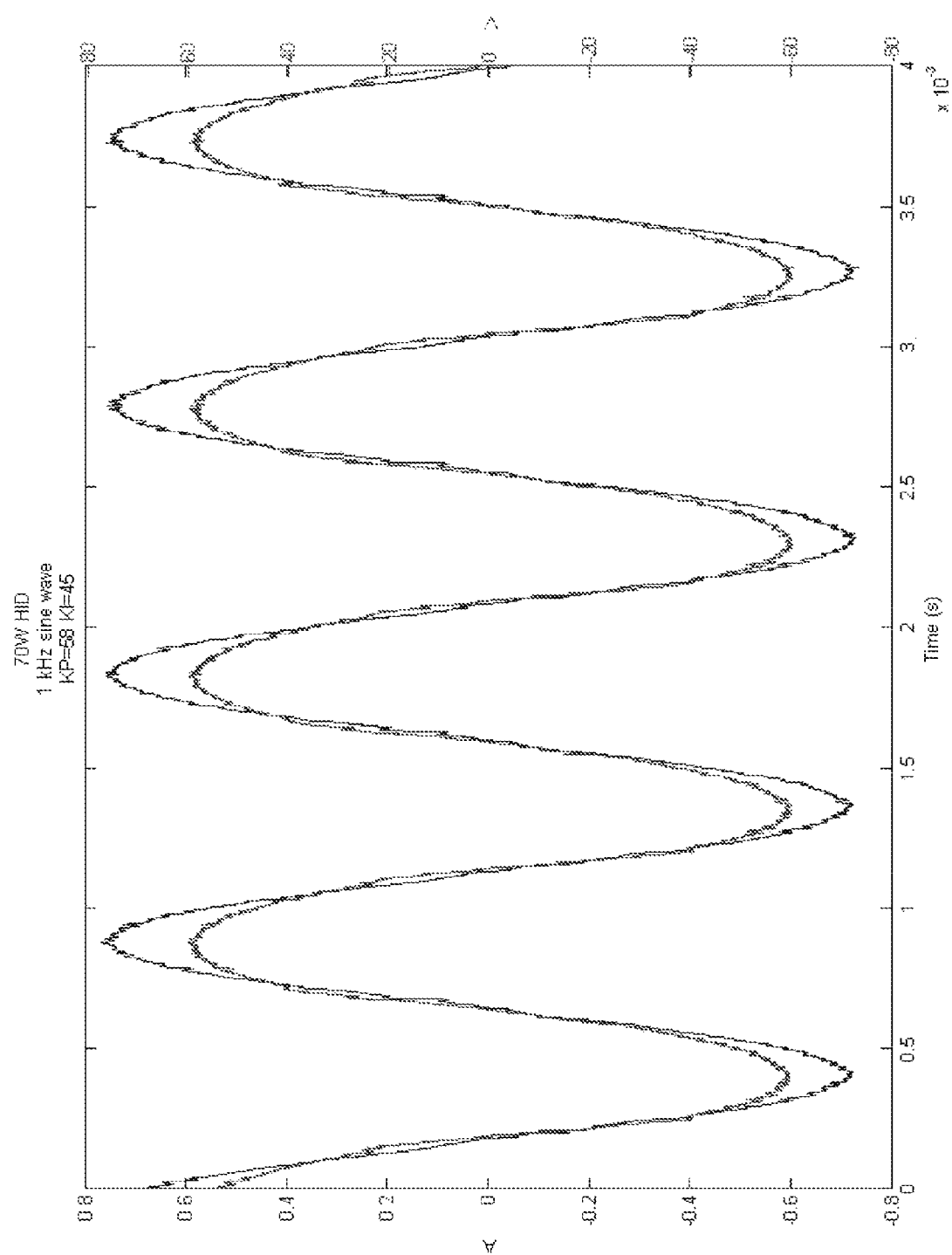
FIG. 14 is graph of a 1 kHz sinusoidal reference waveform and a lamp current over time as applied by a ballast with closed loop control to a lamp during steady state operation according to one embodiment of the invention.
Figure 15:
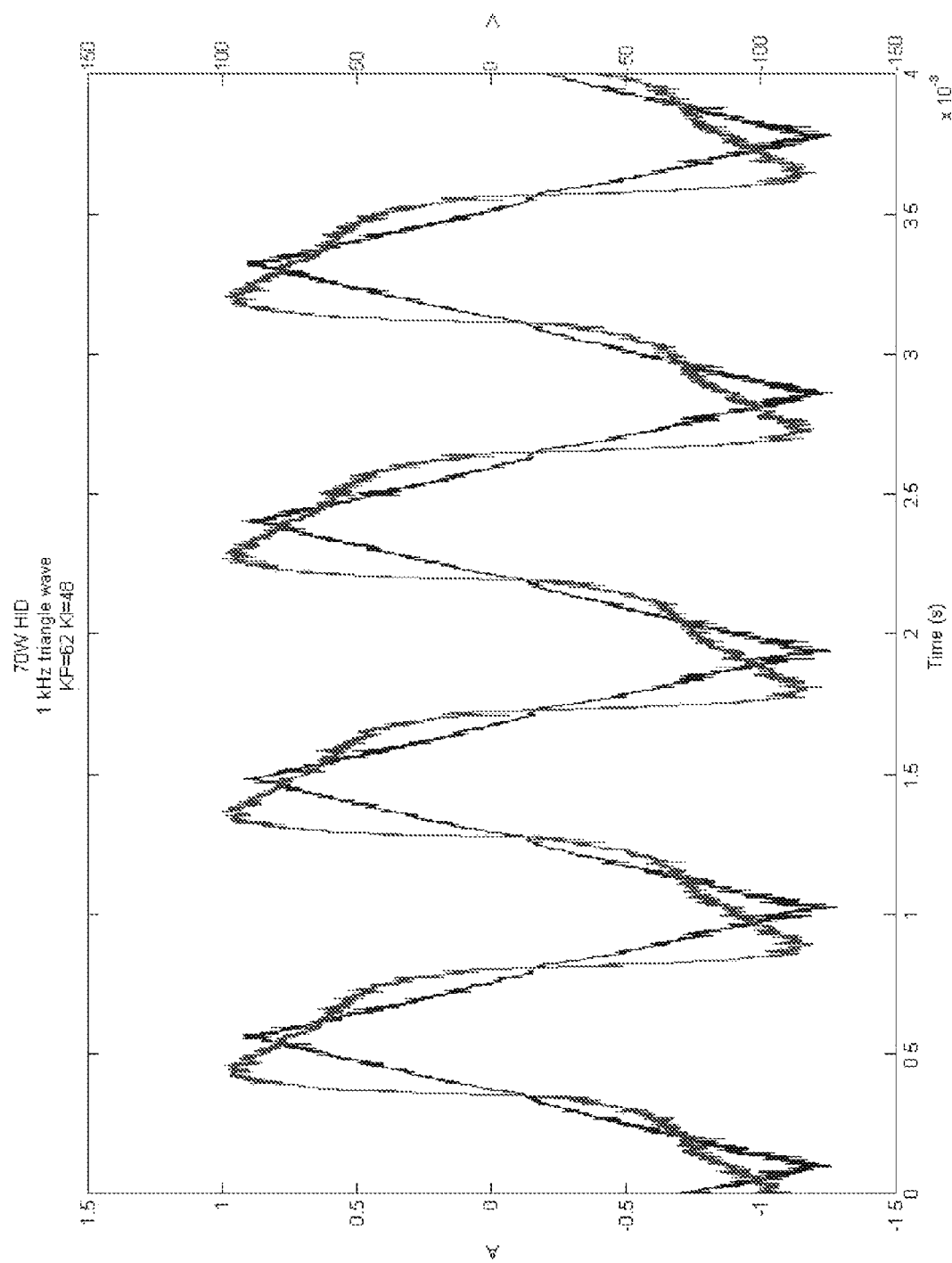
FIG. 15 is graph of a 1 kHz triangular reference waveform and a lamp current over time as applied by a ballast with closed loop control to a lamp during steady state operation according to one embodiment of the invention.
Figure 16:
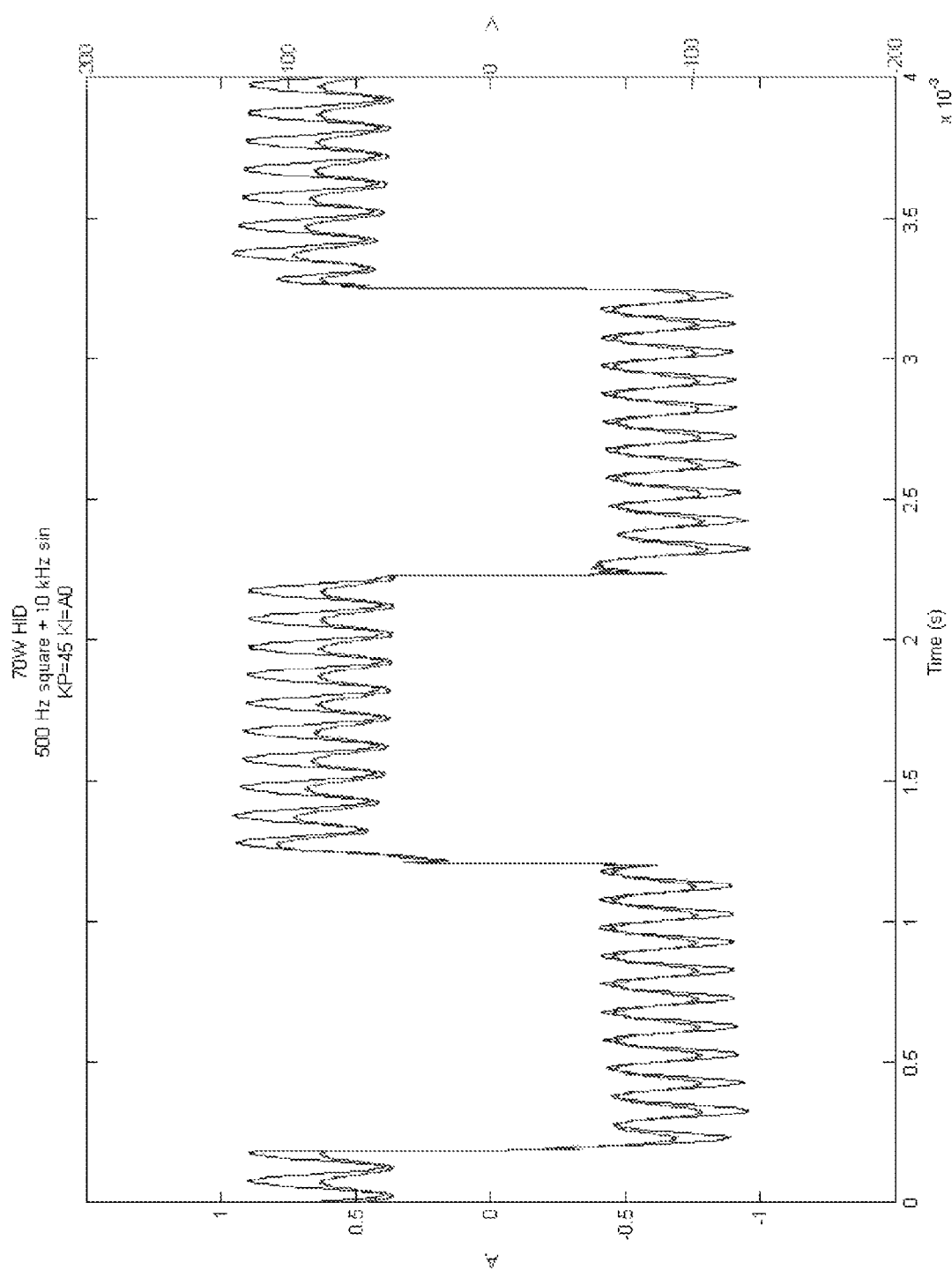
FIG. 16 is graph of a 500 Hz square wave superimposed with a 10 kHz sinusoidal reference waveform and a lamp current over time as applied by a ballast with closed loop control to a lamp during steady state operation according to one embodiment of the invention.

Referring to FIGS. 9 and 10, a triangle reference waveform is applied to the lamp 104 using the embodiment of the invention shown in FIGS. 2-4 during run-up of the lamp 104. In FIG. 9, the controller 108 is prevented from adjusting the output level signal as a function of lamp current such that the ballast 100 behaves similarly to prior art ballasts (i.e., acts as a large time scale current source). In FIG. 10, closed loop control of the current through the lamp 104 is enabled in the ballast 100 (i.e., the ballast adjusts the output level signal as a function of the current through the lamp within the half wave of the period of the reference waveform), and the re-strike current spikes are reduced which reduced damage to the lamp electrodes. Further, blinking of the lamp during run-up is nearly eliminated.

Referring to FIGS. 11-16, the embodiment of FIGS. 2-4 operates the lamp 104 at steady state. Lamp current tracks the reference waveform relatively closely (i.e., with minimal overshoot and undershoot) which decreases the stress on the lamp electrodes. More complex waveforms are also contemplated within the scope of the invention such as a sinusoidal waveform summed with a square wave waveform of a different frequency. In one embodiment, the ballast 100 drives the lamp 104 during run-up with a reference waveform that is different from the ballast 100 uses to drive the lamp 104 during steady state operation (i.e., the two reference waveforms have a different time domain profile and/or frequency domain components). For example, in one embodiment, the ballast 100 drives the lamp 104 with a low frequency square wave (e.g., 1-10 Hz) or a high frequency sine wave (e.g., greater than 10 kHz) reference waveform during glow to arc and a square wave (e.g., 50 Hz-10 kHz) reference waveform during steady state operation. In another example, ultra high pressure mercury lamps may be driven in steady state with a reference waveform comprising a square wave superimposed with a higher amplitude square wave pulse before the zero crossing.

Figure 17:
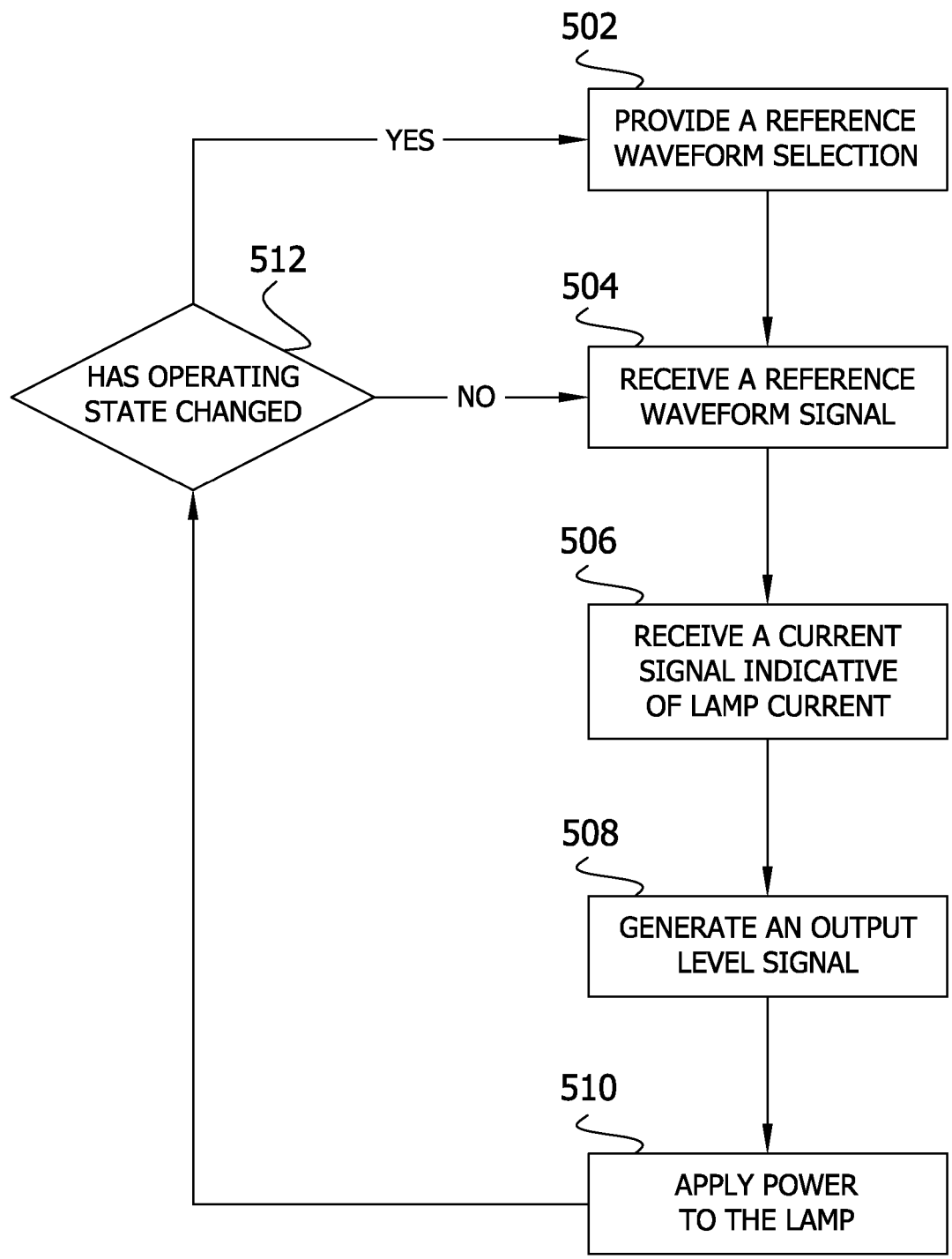
FIG. 17 is a flow chart of a method of powering a lamp according to one embodiment of the invention.

Referring to FIG. 17, a method of providing power to a light source (e.g., lamp 104) according to one embodiment begins at 502 when the controller 108 provides a reference waveform selection to the waveform generator 112. At 504, the controller 108 receives a reference waveform signal indicative of a reference waveform of a plurality of reference waveforms corresponding to the reference waveform selection. At 506, the controller 108 receives a current signal indicative of a current through the lamp 104. At 508, the controller 108 generates an output level signal as a function of the reference waveform signal, the current signal, and operating parameters of the ballast 100. At 510 the amplifier 114 applies power to the lamp 104 as a function of the output level signal. At 512, the controller 108 determines whether the operating state of the lamp has changed. If the operating state has changed, then at 502, the controller 108 provides a different reference waveform selection. If the operating state has not changed, then the controller receives the reference waveform signal from the waveform generator 112 at 504. Optionally, determining a change in operating state of the lamp 104 may be done asynchronously with the other steps (e.g., only determined every 10th cycle through 504 to 510).

In one embodiment of a method of providing power to a light source according to the invention, a controller receives a reference waveform signal indicative of a reference waveform from a waveform generator. The controller also receives a current signal indicative of a current through the light source. The controller generates an output level signal indicative of an output level, and the output level is a function of the received reference waveform signal and the received current signal. The controller generates the output level signal and provides the output level signal at least twice within each period of the reference waveform. An amplifier controls power to the light source as a function of the generated output level signal.

In one embodiment, a ballast controller provides an output level signal to an amplifier, and the amplifier provides varying power to a light source as a function of the output level signal. The controller includes a supervisory processor and a gate level controller. The supervisory processor receives input from a user (e.g., turn on, turn off, dim, bright, etc.) and information indicative of an operating state (e.g., ignition, glow to arc, run-up, steady state, end of lamp life, dimmed operation, hot re-strike, fast run-up, cathode spot operation, or vapor arc) of the light source. The supervisory processor provides an operating parameter as a function of the operating state to the gate level controller. The supervisory processor also provides a reference waveform selection to a waveform generator as a function of the operating state of the light source. The supervisory processor provides a first reference waveform selection to the waveform generator during a first operating state of the light source and a second reference waveform selection to the waveform generator during a second operating state of the light source, and the first reference waveform selection is different from the second reference waveform selection. The gate level controller receives the operating parameter from the supervisory processor and a reference waveform signal from the waveform generator. The reference waveform signal is indicative of a selected one of a plurality of reference waveforms corresponding to the reference waveform selection provided by the supervisory processor. The gate level controller also receives a current signal from a current sensor. The current signal is indicative of a current through the light source. The gate level controller provides the output level to the amplifier as a function of the operating parameter, the reference waveform signal, and the current signal. The gate level controller adjusts the output level signal at least twice within a period of the selected reference waveform.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

Having described aspects of the invention in detail, it will be apparent that modifications and variations are possible without departing from the scope of aspects of the invention as defined in the appended claims. As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A ballast for powering a light source, said ballast comprising:
   a waveform generator for providing a reference waveform signal indicative of a reference waveform having a period;
   a current sensor for providing a current signal indicative of a current through the light source;
   a controller for receiving the reference waveform signal and for receiving the current signal, said controller generating an output level signal indicative of an output level wherein the output level is a function of the received reference waveform signal and the received current signal and wherein the controller provides the output level signal at least twice within each period of the reference waveform; and
   an amplifier for receiving the output level signal from the controller, said amplifier for applying varying power to the light source as a function of the received output level signal wherein the amplifier is responsive to the output level signal to vary the power to the light source at least twice within each period of the reference waveform.

2. The ballast of claim 1 wherein the light source has a plurality of operating states and the controller selects one of a plurality of reference waveforms of the waveform generator as a function of the operating state of the light source.

3. The ballast of claim 2 wherein the controller selects one of the plurality of reference waveforms by providing to the waveform generator, a reference waveform selection corresponding to the selected reference waveform, and wherein the waveform generator receives the reference waveform selection from the controller and provides the selected reference waveform to the controller as a function of the received reference waveform selection, wherein the controller provides a first reference waveform selection to the waveform generator during a first operating state of the light source and a second reference waveform selection to the waveform generator during a second operating state of the light source, wherein said first reference waveform selection is different from said second reference waveform selection.

4. The ballast of claim 1 wherein the waveform generator provides the reference waveform by at least one of the following:
   sequentially reading values from a lookup table and providing the read values to the controller;
   sequentially reading values from a lookup table, converting the read values to an analog signal, and providing the analog signal to controller;
   sequentially calculating values from an algorithm and providing the calculated values to the controller; and
   sequentially calculating values from an algorithm, converting the calculated values to an analog signal, and providing the analog signal to the controller.

5. The ballast of claim 1 wherein the controller comprises a field programmable gate array and a microcontroller, said microcontroller providing an operating parameter to the field programmable gate array and a reference waveform selection to the waveform generator, and wherein the waveform generator receives the reference waveform selection and provides a reference waveform signal indicative of a reference waveform of a plurality of reference waveforms to the field programmable gate array as a function of the received reference waveform selection.

6. The ballast of claim 1 wherein the controller provides a reference waveform selection to the waveform generator and the waveform generator receives the reference waveform selection and provides a reference waveform signal indicative of a reference waveform of a plurality of reference waveforms to the controller as a function of the received reference waveform selection.

7. The ballast of claim 1 wherein the amplifier is an analog amplifier comprising a digital to analog converter for receiving the output level signal from the controller and providing an analog signal level corresponding to the received output level signal to an amplification stage of the amplifier.

8. The ballast of claim 1 wherein the amplifier is a switching amplifier and the output level signal from the controller comprises at least one of the following: a duty cycle, and proportional and integral parameters.

9. The ballast of claim 1 wherein the waveform generator and the controller are packaged together in one integrated circuit and wherein the current sensor is in series with the light source.

10. The ballast of claim 1 wherein the current sensor comprises:
  a resistive element in series with the light source, said resistive element comprising at least one of the following: a resistor or an inductor; and
  a differential amplifier for measuring a voltage across said resistive element and providing a signal indicative of the measured voltage to the controller.

11. A method of providing power to a light source, said method comprising:
  receiving a reference waveform signal indicative of a reference waveform from a waveform generator at a controller of a ballast;
  receiving a current signal indicative of a current through the light source at the controller;
  generating an output level signal indicative of an output level at the controller wherein the output level is a function of the received reference waveform signal and the received current signal and wherein the controller provides the output level signal at least twice within each period of the reference waveform;
  controlling power from an amplifier of the ballast to the light source as a function of the received output level signal; and wherein the amplifier is responsive to the output level signal to vary the power to the light source at least twice within each period of the reference waveform.

12. The method of claim 11 wherein the light source has a plurality of operating states and the controller selects one of a plurality of reference waveforms of the waveform generator as a function of the operating state of the light source.

13. The method of claim 12 wherein the controller selects one of the plurality of reference waveforms by providing to the waveform generator, a reference waveform selection corresponding to the selected reference waveform, and wherein the waveform generator receives the reference waveform selection from the controller and provides the selected reference waveform to the controller as a function of the received reference waveform selection, wherein the controller provides a first reference waveform selection to the waveform generator during a first operating state of the light source and a second reference waveform selection to the waveform generator during a second operating state of the light source, wherein said first reference waveform selection is different from said second reference waveform selection.

14. The method of claim 11 wherein the waveform generator provides the reference waveform by at least one of the following:
  sequentially reading values from a lookup table and providing the read values to the controller;
  sequentially reading values from a lookup table, converting the read values to an analog signal, and providing the analog signal to controller;
  sequentially calculating values from an algorithm and providing the calculated values to the controller; and
  sequentially calculating values from an algorithm, converting the calculated values to an analog signal, and providing the analog signal to the controller.

15. The method of claim 11 wherein the controller comprises a field programmable gate array and a microcontroller, said microcontroller providing an operating parameter to the field programmable gate array and a reference waveform selection to the waveform generator, and wherein the waveform generator receives the reference waveform selection and provides a reference waveform signal indicative of a reference waveform of a plurality of reference waveforms to the field programmable gate array as a function of the received reference waveform selection.

16. The method of claim 11 wherein the controller provides a reference waveform selection to the waveform generator and the waveform generator receives the reference waveform selection and provides a reference waveform signal indicative of a reference waveform of a plurality of reference waveforms to the controller as a function of the received reference waveform selection.

17. The method of claim 11 wherein the amplifier is an analog amplifier comprising a digital to analog converter for receiving the output level signal from the controller and providing an analog signal level corresponding to the received output level signal to an amplification stage of the amplifier.

18. The method of claim 11 wherein the amplifier is a switching amplifier and the output level signal from the controller comprises at least one of the following: a duty cycle, and proportional and integral parameters.

19. The method of claim 11 wherein the waveform generator and the controller are packaged together in one integrated circuit, and wherein the current sensor comprises:
  a resistive element in series with the light source, said resistive element comprising at least one of the following: a resistor or an inductor; and
  a differential amplifier for measuring a voltage across said resistive element and providing a signal indicative of the measured voltage to the controller.

20. A ballast controller for providing an output level signal to an amplifier, said amplifier providing varying power to a light source as a function of the output level signal, said controller comprising:
  a supervisory processor for:
    receiving input from a user;
    receiving information indicative of an operating state of the light source;
    providing an operating parameter as a function of the operating state of the light source; and
    providing a reference waveform selection to a waveform generator as a function of the operating state of the light source, wherein the supervisory processor provides a first reference waveform selection to the waveform generator during a first operating state of the light source and a second reference waveform selection to the waveform generator during a second operating state of the light source, wherein said first reference waveform selection is different from said second reference waveform selection; and
  a gate level controller for:
    receiving the operating parameter from the supervisory processor;
    receiving a reference waveform signal from the waveform generator, wherein the reference waveform signal is indicative of a selected one of a plurality of reference waveforms corresponding to the provided reference waveform selection;
receiving a current signal from a current sensor; and
providing the output level to the amplifier as a function of the operating parameter, the reference waveform signal, and the current signal, wherein the gate level controller adjusts the output level signal at least twice within a period of the selected reference waveform.

* * * * *